INVENTOR.
John H. Homrighous

INVENTOR.
John H. Homrighous

INVENTOR.
John H. Homrighous

INVENTOR.

John H. Homrighous

INVENTOR

John H. Homrighous

INVENTOR.
John H. Homrighous

Sept. 30, 1952 J. H. HOMRIGHOUS 2,612,553

TELEVISION SYSTEM

Filed Dec. 27, 1947 14 Sheets-Sheet 7

INVENTOR.

John H. Homrighous

INVENTOR.

INVENTOR.
John H. Homrighous

INVENTOR.
John H. Homrighous

INVENTOR.
John H. Homrighous

Sept. 30, 1952 J. H. HOMRIGHOUS 2,612,553

TELEVISION SYSTEM

Filed Dec. 27, 1947 14 Sheets-Sheet 12

INVENTOR.

John H. Homrighous

Sept. 30, 1952 J. H. HOMRIGHOUS 2,612,553

TELEVISION SYSTEM

Filed Dec. 27, 1947 14 Sheets-Sheet 13

INVENTOR.

John H. Homrighous

Sept. 30, 1952 J. H. HOMRIGHOUS 2,612,553

TELEVISION SYSTEM

Filed Dec. 27, 1947 14 Sheets-Sheet 14

*INVENTOR.*

John H. Homrighous

Patented Sept. 30, 1952 2,612,553

UNITED STATES PATENT OFFICE 2,612,553

TELEVISION SYSTEM

John H. Homrighous, Oak Park, Ill.

Application December 27, 1947, Serial No. 794,188

43 Claims. (Cl. 178—5.2)

This invention relates to a television system for the transmission and reception of video signals for black and white pictures or color pictures of a scene being televised.

Accordingly, one of the main objects of my invention is to provide means to utilize a number of picture projecting devices to project either in black and white or in colors partial picture images of scenes in such manner as to produce complete picture images on large distant screens.

Another main object of my invention is to provide means to synchronize the scanning actions in a satellite or private television transmitter with the scanning actions at a main or community transmitting station in order to broadcast picture signals representative of scenes televised in private television systems.

A third object is to provide an improved all electronic system to produce video signals from different image fields, representative of different colors in a scene being televised, for developing composite picture images.

Another object of my invention is to provide improved means to produce simultaneously video signals from different image fields representative of different colors in a scene being televised, and to produce sound signals accompanying each image field for developing composite picture images with stereophonic sound effects.

Another object is to provide an improved television receiver that may be synchronized from either of two different sets of synchronizing signals.

Another object is to provide means to produce images in successive frames on a color motion picture film representative of the different colors in a scene being televised.

To provide improved means of producing different images in succession on a number of motion picture films from different sets of reproduced images of a scene being televised, each film being representative of a different color in the scene is another object of my invention.

Another object of my invention is to provide an improved optical device, whereby a number of moving picture cameras are provided with a common optical path from an object scene to produce on their associated film successive partial images of the scene, the images on each film representative of a different color in the scene.

Another object is to provide a number of picture projectors to project like images in color to a number of distant individual screens, whereby many more people may view pictures of the same scene at the same time.

To provide at a distribution center or a main theater means to produce video signals from the images on a moving picture film, to produce message signals from the associated sound track and to transmit these signals to a number of motion picture theaters, where the picture images may be reproduced from the video signals and projected to large distant screens with accompanying sound is another object.

Another object is to provide means to produce video signals and other signals representative of accompanying sound from a moving picture film while picture images from the same film are being shown on the screen at a theater.

An additional object is to provide large viewing screens for remote signs and store windows to display advertising matter with motion pictures.

Another object is to provide a device for directing light rays received from a scene over a single path to a number of motion picture cameras for recording on each film in the different cameras images representative of a different color.

Another object is to provide a device for directing light rays from a number of moving picture machines, each having a picture film representative of a different color, through color filters over a single path to a distant screen.

Still another object is to provide means to televise picture images of a scene produced by radio waves reflected from an object scene and focused on a radio wave sensitive screen.

Messages in this specification are to be understood to include any intelligence represented by sound or by picture signals.

A channel in this specification is to be understood as a one way path for the transmission of electrical signals between two stations and may be one of a number of channels or carrier wave channels in a transmission path or lane for the transmission of signals representative of a message.

The preferred form of scanning control system described in this specification may be similar to my "self synchronizing system" shown and described in Patent Number 2,398,641, issued April 16, 1946, and application Serial Number 476,897, filed February 24, 1943, now Patent 2,521,009 issued September 5, 1950, or the system shown in co-pending application Serial Number 542,317, filed June 27, 1944, now Patent 2,521,008 issued September 5, 1950; the present system is similar in that the line control pulses may return the cathode ray from any location on its associated screen to the starting point for the next horizontal line, and the field control pulses may return the cathode ray from any location on its associated screen to the starting point for the first horizontal line in the next succeeding frame or picture.

This control system may be known as "a follow up system"; that is, the scanning device at the receiving station is not driven into synchronism but follows the horizontal and vertical movements of the scanning mechanism at the transmitting station.

Several methods for developing picture signals representative of different colors in the scene being televised have been devised which make use of mechanical moving parts. Other systems may employ separate cathode ray tubes for different colors in a scene. The instant invention in the preferred form may be similar to my co-pending application Serial Number 638,038 filed December 29, 1945, now Patent 2,521,010 issued September 5, 1950, in that color scenes are converted into groups of images of varying densities on a cathode ray tube screen, and these images are translated back into the original colors again without the aid of mechanically moving mechanisms.

In the instant invention picture signals, sound signals accompanying the pictures and sound signals representative of weather and time of day reports are preferably modulated on a common carrier wave, which is similar to the showing in my prior application before mentioned, Serial Number 542,317.

In my co-pending application, Serial Number 638,038, I have shown a line sequential color television system; in this application I describe an all electronic field sequential system and an all electronic system for simultaneously scanning the different image fields. Any one of the systems may employ one or three cathode ray tubes by utilizing a device at both the transmitter and receiver comprising a cathode ray tube cover or compartment provided with mirrors of which at least two both pass and reflect light rays. At the transmitter this device may direct received light rays from a single or common lens system to three different image screens or three different locations on one screen. The scanning may be one screen at a time or all three screens may be scanned simultaneously. The field sequential system would permit more economical home receivers, since receiver circuits would only be required for the reception of one carrier wave, whereas, the simultaneous system will require in effect reception of three carrier waves.

Each of the transmitting and receiving stations are provided with a message distributor for allotting different periods of time for picture signals, sound signals accompanying the pictures and other signals for reports on the weather and time of day.

Single path optical devices may be provided at the transmitting stations for producing a plurality of images representative of different colors in a scene or the different colors in a motion picture film. At the receiving stations a single path optical device may be provided to project images representative of different colors to a distant screen, or several optical paths may be provided to project the images to a large screen.

Motion picture cameras are provided with light sensitive film adapted to record different series of images appearing on a cathode ray tube screen, each series representative of a different color, whereby, each of the films after development is representative of a different color.

A novel cathode ray pick up tube is provided to produce images of a scene by reflected radio waves.

A novel method to produce stereoscopic picture images either on a motion picture film or a television screen is provided by superimposing the images appearing on different cathode ray tube screens, of the same scene but from different points of view, onto a common screen within the view of another cathode ray tube for producing a series of picture signals representative of the images on said common screen for radio transmission, whereby, stereoscopic picture images may be produced at distant receiving stations in monochrome or color.

In the instant invention a method is also provided whereby the same pictures showing in one or more moving picture theaters may be televised during a short period of time for advertising purposes.

Other objects and advantages will appear from the following description taken in connection with the accompanying drawing in which:

Figures 1 and 4 are simplified block diagrams of television transmitting stations employed in this invention.

Figures 2, 5, and 25 show portions of moving picture films.

Figures 3, 6, 7, and 21 show lens and mirror devices for camera and viewing cathode ray tubes.

Figure 8 is a circuit diagram for the message distributor employed at the transmitting stations.

Figures 9, 10, and 11 are graphical views illustrating the time periods for a number of messages including control signals.

Figures 1, 2, 3, 5, 6, 7:
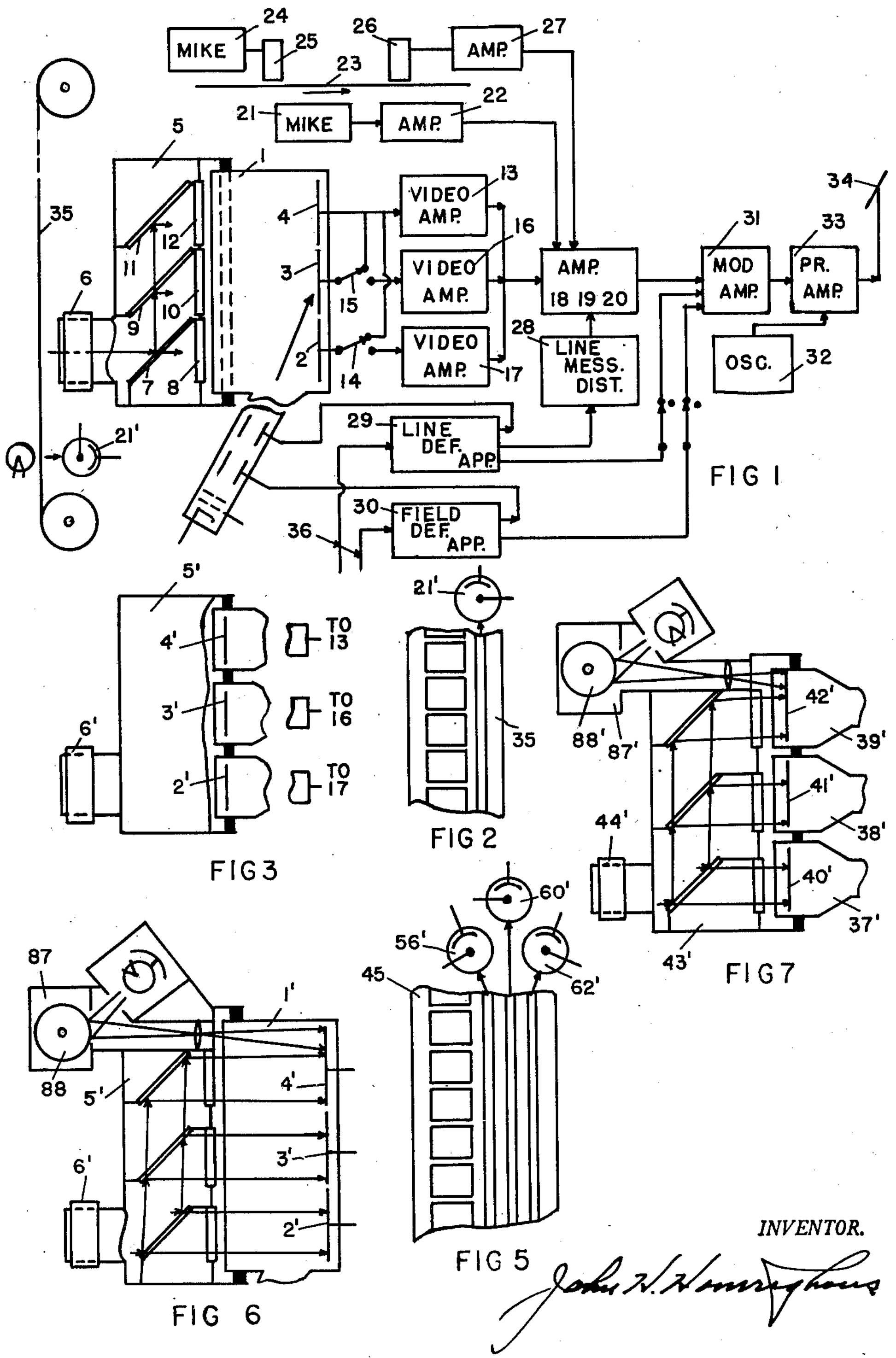

With reference to Figure 1 the numeral 1 shows a cathode ray camera tube of conventional type, such as the "iconoscope" or the "image orthicon," having an image screen or electrode, which may be divided into three sections 2, 3, and 4 extending vertically or horizontally in the tube on which partial images of the same object or scene are projected over a single optical path through the light ray passing and reflecting system or devices in compartment or member 5. The cathode ray tube also comprises an electron gun for generating a ray of electrons directed toward the screens and two sets of deflecting plates for deflecting the electron ray at the line and field frequencies, so that it is caused to can the several screens. Electromagnetic deflection also may be used.

Light rays entering the adjustable lens system illustrated at 6 are divided at the partially silvered mirror 7, some of the rays passing through the mirror and color filter 8 onto the image screen 2. The light rays reflected from the mirror 7 are directed toward the second partially silvered mirror 9; the rays reflected from the mirror 9 are directed through the color filter 10 onto the image screen 3. The light rays passing through the mirror 9 are directed toward the opaque mirror 11 where they are reflected through the color filter 12 onto the image screen 4. While I have shown mirrors as the preferred form of my invention, it is to be understood that an optical system may be employed in place of the mirrors 7, 9, and 11. The cover 5 may be rotated one hundred eighty degrees to reverse the color of light directed to screens 2 and 4.

Picture signals are developed by the electron ray scanning the several screens in tube 1 either a line at a time on the different screens in sequence or a field at a time in sequence depending on whether the light passing and reflecting devices in cover 5 are arranged to produce images in a horizontal or vertical row on the screen. Tube 1 as illustrated is for field sequential scanning. Where line sequential scanning is desired, the screens 2, 3, and 4 would be arranged horizontally in tube 1, or line and field scanning reversed. The picture signals may be fed to video frequency amplifier 13. By the operation of the switches 14 and 15, the amplifiers 16 and 17 may be employed to provide individual amplification for each image screen; from the amplifier 13 or the amplifiers 13, 16, and 17 the video or picture signals are fed to the amplifier 18. Sound signals from the microphone 21 related to the picture signals may be amplified at 22 and supplied to the amplifier 19. When televising from a film, the microphone may be replaced by the photo cell 21'. Sound signals representative of weather reports and time of day messages, recorded on an endless magnetic wire 23 through the microphone 24 and recording coil 25, may be reproduced by coil 26, amplified at 27, and fed to the amplifier 20.

The line message distributor 28 allots suitable periods of time during each horizontal sawtooth wave produced in the horizontal deflecting apparatus 29 for picture signals, fragmentary portions of sound signals related to the picture signals and fragmentary portions of sound signals for weather and time of day messages. These signals together with the horizontal control signals from the line deflecting apparatus 29 appearing at the end of each horizontal deflection, and the field control signals from the field deflecting apparatus 30 appearing between the image fields are fed to modulation amplifier 31.

A carrier wave is produced by the oscillator 32. In the power amplifier 33 this carrier wave is modulated from the amplifier 31 by the picture signals, sound signals and control signals which are applied to the antenna 34. When this transmitter is used in a private television system, synchronizing or control signals from an associated receiver may be supplied over the conductors 36 to synchronize the private television system with a public broadcast system.

From the above description it is shown that sound signals related to the picture images are transmitted on the carrier wave with the picture signals; however, the related sound signals may be transmitted over a separate carrier wave as shown in my prior application, Serial Number 638,038.

The lens system 6 may be adjusted for use with a colored picture film 35 as illustrated in Figure 2 and also for televising distant scenes. It is to be understood that three individual cathode ray tubes as illustrated in Figure 3 having image screens 2', 3', and 4' may be substituted in Figure 1 for tube 1 and its associated image screens 2, 3, and 4.

Figures 4, 9:
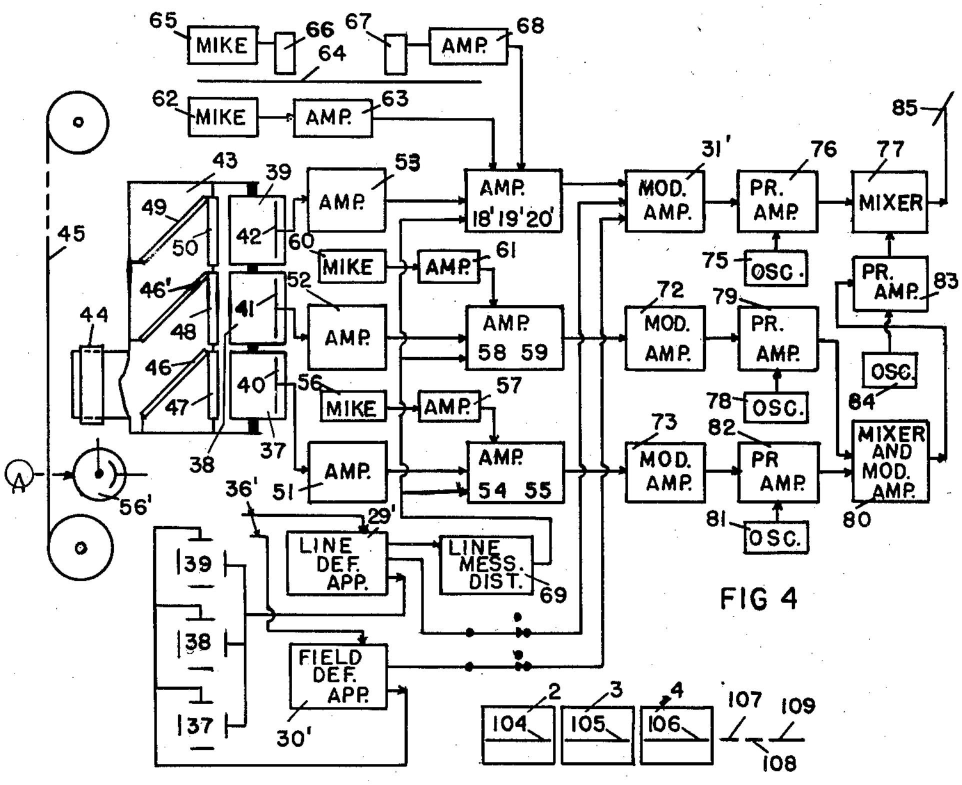

Figure 4 may be considered as a modification of Figure 1 but for simultaneously scanning three cathode ray tube screens to produce picture signals representative of different colors. The numerals 37, 38, and 39 show three cathode ray camera tubes of conventional type, such as the "iconoscope" or the "image orthicon," each tube having an image screen or electrode 40, 41, and 42 on which partial images of the same object or scene are projected over a single optical path through the light ray passing and reflecting system or devices in the cover or compartment 43. Each cathode ray tube also comprises an electron gun for generating a ray of electrons directed toward its associated screen and two sets of deflecting plates for deflecting the electron ray at the line and field frequencies to scan its associated screen. Electromagnetic deflection also may be used.

Light rays entering the adjustable lens system illustrated at 44 from an object scene or from a colored picture film 45 are divided at the partially silvered mirror 46, some of the rays passing through the mirror and color filter 47 onto the image screen 40. The light rays reflected from the mirror 46 are directed toward the second partially silvered mirror 46'; the light rays reflected from the mirror 46' are directed through the color filter 48 onto the image screen 41. The light rays passing through the mirror 46' are directed toward the opaque mirror 49 where they are reflected through color filter 50 onto the image screen 42. An optical system may be employed in place of the mirrors 46, 46', and 49. The compartment 43 may be rotated one hundred and eighty degrees to change the color of light reaching the screens 40 and 42. The colored moving picture film 45 as illustrated in Figure 5 comprises three different sound tracks with three photo cells 56', 60', and 62', one for each sound track for stereophonic effects.

Picture signals are developed by the several electron rays scanning simultaneously their associated image screens in the tubes 37, 38, and 39. These picture signals may be fed to amplifiers 51, 52, and 53 respectively. The picture signals from the amplifier 51 due to the color filter 47 may be representative of the green color in the scene being televised and are supplied to the amplifier 54. Sound signals from a microphone 56 which may be placed on the left side of the scene are amplified at 57 and fed to the amplifier 55. When televising from the film 45 the microphone 56 may be replaced with the photo cell 56'. The picture signals from the amplifier 52 due to the color filter 48 may be representative of the red color in the film 45 or the scene being televised and are fed to the amplifier 58. Sound signals from the microphone 60 which may be located near the center of the scene are amplified at 61 and fed to amplifier 59. The photo cell 60' shown in Figure 5 may be substituted for the microphone 60. The picture signals from the amplifier 53 may be representative of blue color in the scene due to the color filter 50' and may be fed to the amplifier 18'. Sound signals from the microphone 62 located on the right side of the televised scene may be amplified at 63 and fed to the amplifier 19'. The photo cell 62' shown in Figure 5 may be substituted for the microphone 62. Sound signals representative of weather reports and time of day messages, recorded on the endless magnetic wire 64 through the microphone 65 and recording coil 66, may be reproduced by the coil 67, amplified at 68, and fed to the amplifier 20'.

The line message distributor 69 controls the amplifiers 18', 19', and 20' to allot suitable periods of time during the interval for increasing potential in each horizontal sawtooth wave produced in the horizontal deflecting apparatus 29' for picture signals, fragmentary portions of sound signals produced at the microphone 62 located on right side of scene and fragmentary portions of recorded sound signals. These signals may be fed to the modulator amplifier 31'. At the same time the message distributor 69 controls the amplifiers 58 and 59 to allot similar periods of time for picture signals and fragmentary portions of sound signals produced at the microphone 60 located approximately in the center of the scene. The signals from the amplifiers 58 and 59 may be fed to the modulation amplifier 72. Also the distributor 69 may control the amplifiers 54 and 55 to allot similar periods of time for picture signals and fragmentary portions of sound signals produced at the microphone 56 located at the left of the scene. The signals from the amplifiers 54 and 55 may be supplied to the modulation amplifier 73.

The horizontal deflecting plates in the tubes 37, 38, and 39 are connected in parallel to the line deflecting apparatus 29' and the vertical deflecting plates are connected in parallel to the field deflecting apparatus 30' so that the electron rays in all these tubes scan their associated screens in unison. Trigger or control impulses from the line and field deflecting apparatus are fed to the modulation amplifier 31' for synchronizing the scanning actions at receiving stations.

A main carrier wave is produced by the oscillator 75. In the power amplifier 76 this carrier wave is modulated from the amplifier 31' by the picture signals two series of sound signals and control signals which may be supplied to the mixer 77. A sub carrier wave is produced by the oscillator 78. In the power amplifier 79 this sub-carrier wave is modulated from the amplifier 72 by picture signals and sound signals which may be fed to the mixer 80. A second sub carrier wave is produced by the oscillator 81. In the power amplifier 82 the second sub carrier wave is modulated from the amplifier 73 by picture signals and sound signals which may be fed to the mixer 80. The picture signals and sound signals are applied through the mixer and modulation amplifier 80 to modulate a second main carrier wave in the power amplifier stage 83 produced by the oscillator 84. The signals from the amplifier 83 are fed to the mixer stage 77.

The two main carrier waves (one, modulated by picture signals, sound signals and control signals, the other, modulated by sound signals and picture signals) are mixed in stage 77 and fed to the antenna 85 for radio transmission. When this transmitter is used in a private television system, synchronizing or control signals from an associated receiver may be supplied over the conductors 36' in order to synchronize the private system with a community broadcast system.

From the above description it is seen that three series of picture signals from the same scene and three series of sound signals from different locations in the scene are transmitted for reproduction of pictures with stereophonic sound.

Referring to Figure 6 the cathode ray tube 1' and the member or compartment 5' may be substituted for the cathode ray tube 1 and the tube compartment 5 in Figure 1. The compartment 5' comprises two lens systems, one by short focal length to focus the clock 87 or other subject matter on a relatively narrow strip across the top of the electrode 4'. The clock 87 may be of a conventional type provided with rotatable wheels, one wheel shown at 88, for indicating the time of day. Images of the clock numerals would only appear on the top screen or electrode 4'. No images appear at the top of electrodes 2' and 3'. The lens system 6' is similar to the adjustable lens 6 described in connection with Figure 1.

Referring to Figure 7 the cathode ray tubes 37', 38', and 39' and the compartment 43' may be substituted for cathode ray tubes 37, 38, and 39 and the tube compartment 43 in Figure 4. The compartment 43' comprises two lens systems, one of short focal length to focus the clock 87' or other subject matter on a relatively narrow strip across the electrode 42' in the tube 39'. The clock may be of conventional type similar to the clock in Figure 6 having rotatable wheels, one wheel shown at 88', for indicating the time. Images of the clock numerals would only appear on the electrode 42', no clock images appearing on electrodes 40' and 41'. The lens 44' and other light reflecting devices in compartment 43' are similar to those described for Figure 4.

Figures 8, 25:
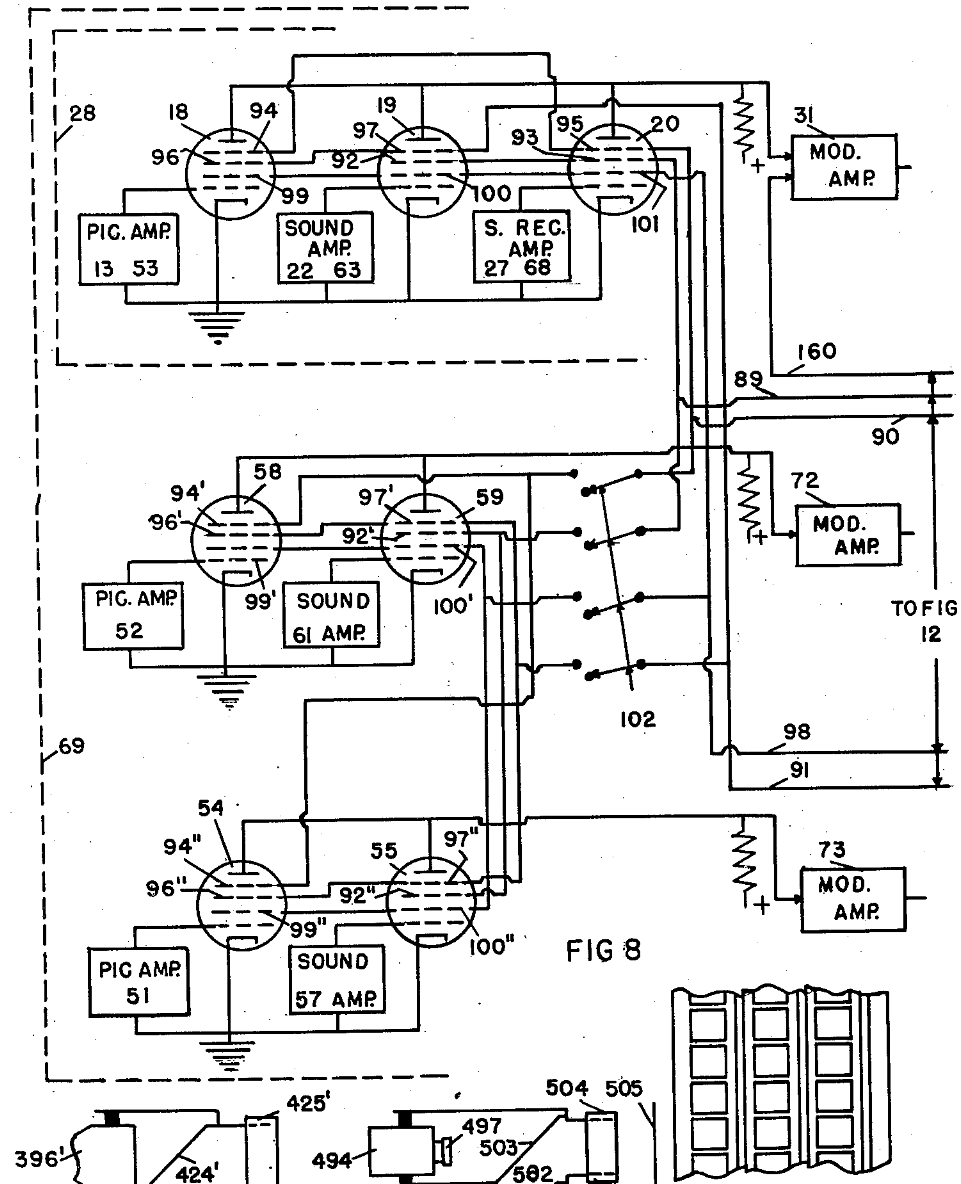

Figure 8 shows the message distributor or period of time selector illustrated at 28 and 69 in Figures 1 and 4 to allot suitable periods of time in a series of sawtooth waves for different messages and control signals. The message distributor 28 for the transmitter in Figure 1 comprises multi-element amplifier tubes 18, 19, and 20 having their anodes connected in parallel to the modulation amplifier 31. Video amplifier 13 or amplifiers 13, 16, and 17 may be connected in the cathode grid circuit of amplifier 18. Sound amplifier 22 may be connected in the cathode grid circuit of amplifier 19, and reproduction amplifier 27 may be connected in the cathode grid circuit of amplifier 20.

Figure 12:
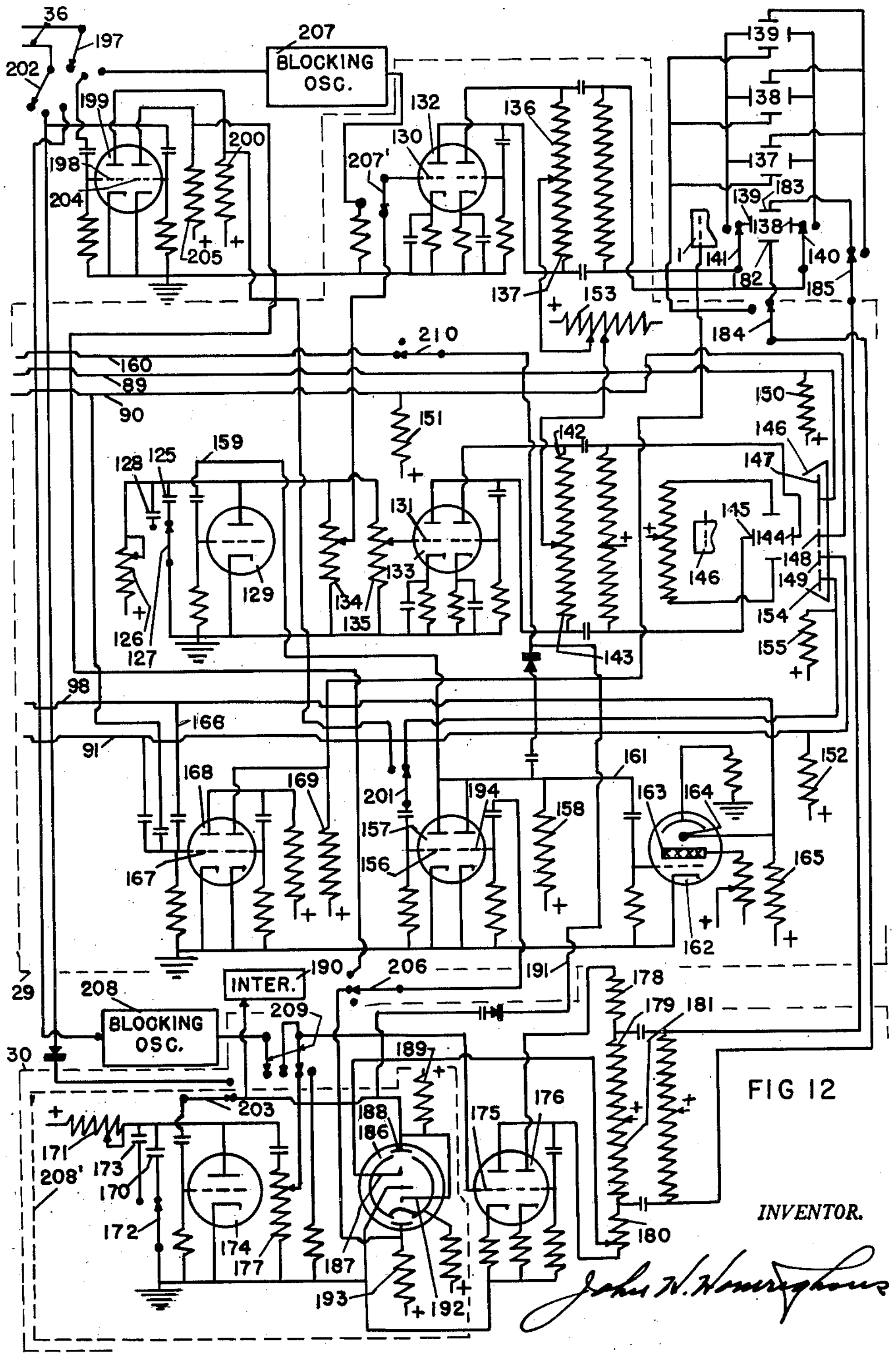
Figure 12 is a circuit diagram for the horizontal and vertical deflecting equipments employed at the transmitting stations.

Control potentials developed during the interval for each sawtooth wave in the apparatus and associated circuits of Figure 12, to be explained in more detail later, may be applied over conductors 89, 90, and 91 to the control electrodes of amplifier 18, 19, and 20 to select message signals from these amplifiers in sequence; for instance, negative potential applied over conductor 89 to the control electrodes 92 and 93 blocks signal current through the amplifier stages 19 and 20 during the forward deflection of the electron ray in tube 1 so that video signals from the amplifier 18 may be supplied to the input of modulation amplifier 31. As the electron ray in tube 1 reaches the leaving edge of one of its associated screens, the potential on conductor 89 and control electrodes 92 becomes positive to permit amplification of sound signals, from amplifier 22, through amplifier 19 which may be fed to the modulation amplifier 31 following the modulation of picture signals. At the same time that conductor 89 becomes positive, negative potential is applied over conductor 90 to the control electrodes 94 and 95 to block signaling current through amplifiers 18 and 20 during the period that tube 19 is conductive. After a short period of sound signal modulation from amplifier 19, conductor 90 and control electrode 95 become more positive to permit amplification of recorded sound signals, from amplifier 27, through the amplifier 20 which may be fed to the modulation amplifier 31 following the modulation of sound signals from amplifier 19. At the same time that conductor 90 becomes more positive, negative potential is applied over conductor 91 to the control electrodes 96 and 97 to block signaling current through the amplifiers 18 and 19 during the period that tube 20 is conductive. After a short period of sound signal modulation from the amplifier 20 the sawtooth wave developed in the circuits of Figure 12 is triggered to restore the circuits of Figure 8 to normal condition and to return the cathode ray in tube 1 to start the next horizontal line. During this retrace period negative potential is applied over conductor 98 to the control electrodes 99, 100, and 101 to render tubes 18, 19, and 20 non-conductive during the retrace period or during the interval that the sawtooth potential is decreasing to the starting value of the next sawtooth wave.

From the above description it has been shown that picture signals and other message signals from two different sources are modulated on a main carrier wave in successive rotation.

When the transmitter shown in Figure 4 for simultaneous scanning of three separate image screens is used, other carrier or sub carrier waves may be produced at the transmitter as explained above. The message distributor 69 may be provided with suitable control apparatus and associated circuits to modulate the carrier waves with picture signals and other message signals in successive rotation.

When using Figure 4 with Figures 8 and 12 a carrier wave may be produced and modulated with picture signals and other message signals as explained above, that is, picture signals from amplifier 53 and sound signals from the amplifiers 63 and 68. The picture signals produced in the tube 42 and fed to amplifier 53 may be representative of a certain color such as blue in the scene or moving picture film being televised. The sound signals from amplifier 63 may be representative of the sound produced at the microphone 62 located to the right of the scene, or the microphone 62 may be replaced by a photo cell as illustrated at 62′ in Figure 5 to produce signals representative of a sound track on the film 45. The sound signals from amplifier 68 may be representative of recorded reports. The picture signals and fragmentary portions of the sound signals, after amplification in their respective control amplifiers 18, 19, and 20, are fed to the modulation amplifier 31 in successive rotation.

A first sub carrier wave may be produced at the transmitter and modulated with picture signals from the amplifier 52 and sound signals from the amplifier 61. The picture signals produced in cathode ray tube 41 and fed to amplifier 52 may be representative of a certain color such as red in the scene or film 45. The sound signals from the amplifier 61 may be representative of the sound produced at the microphone 60 located near the center of the scene, or the microphone may be replaced by a photo cell to produce signals representative of another sound track on film 45. The picture signals and fragmentary portions of the sound signals after amplification in their respective control amplifiers 58 and 59 are fed to the modulation amplifier 72 in successive rotation. The amplifiers 58 and 59 may become periodically conductive by the potentials supplied from conductors 89, 90, and 91 and applied through the switches 102 to the amplifier control electrodes having primed reference numerals similar to those of the corresponding electrodes in tubes 18 and 19. Therefore, picture signals and sound signals may be modulated in the first sub carrier wave during similar periods of time that the main carrier wave is modulated with like signals.

A second sub carrier may be produced at the transmitter and modulated with picture signals from the amplifier 51 and sound signals from amplifier 57. The picture signals produced in the cathode ray tube 40 and fed to the amplifier 51 may be representative of the green and neutral colors in the scene or film being televised. The sound signals from the amplifier 57 may be representative of the sound produced at the microphone 56 located to the left of the scene, or a photo cell may be substituted for 56, to produce signals representative of a third sound track on film 45. The picture signals and fragmentary portions of the sound signals after amplification in their respective control amplifiers 54 and 55 are fed to the modulation amplifier 73 in successive rotation. The amplifiers 54 and 55 may become periodically conductive by the potentials supplied from conductors 89, 90, and 91 and applied through the switches 102 to the amplifier control electrodes having double primed reference numerals similar to those of the corresponding electrodes in tubes 18 and 19. Therefore, picture signals and sound signals may be modulated on the second sub carrier wave in time relation to the modulation of similar signals on the main carrier wave.

From the above description it has been shown that the different colors in a scene or on a moving picture film may be separated and video signals representative of each simultaneously modulated on different carrier waves for reproduction at the receiver in complete color pictures. Also it has been shown that sound signals from at least three different locations in a scene or from three different sound tracks on a moving picture film may be periodically modulated on the different carrier waves for stereophonic sound effects at the receiver. However, only one set of sound signals related to the pictures may be transmitted.

Referring to Figure 9, the different periods of time for the several different messages may be as illustrated, wherein 2, 3, and 4 may represent the image screens in the cathode ray tube 1, Figure 1, and the lines 104, 105, and 106 the periods of time for three sets of picture signals in each horizontal deflection, by scanning a line at a time in the different image fields in sequence. The line 107 may represent the period of time for sound signals representative of the message related to the picture, line 108 may represent the period of time for sound signals representative of data on the weather and time of day, and line 109 may represent the period of time for the horizontal trigger or synchronizing signals. While I have illustrated three image screens, it is to be understood that only one screen may be employed with the numerals 2, 3, and 4 representing three different image locations on the single screen. The period of time for different portions of the several signals may be varied to suit conditions.

Figure 10:
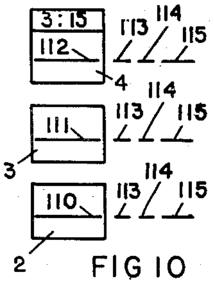

In Figure 10 I have shown the different periods of time for the several different signals when the different picture fields are arranged in a vertical row on a cathode ray tube image screen, or a different tube may be used for each color. The numerals 2, 3, and 4 may represent the image screens as illustrated in Figure 1, or Figure 3, and each of the lines 110, 111, and 112 may represent the period of time for picture signals in their associated image field during horizontal deflection by scanning one field at a time in sequence. The lines 113 may represent the period of time for sound signals related to the pictures; lines 114 may represent the period of time for sound signals for reports; and lines 115 may represent the period of time for the horizontal trigger or synchronizing signals. The images of the clock are indicated at top of screen 4. A different arrangement of the periods may be employed if desired; for instance, the period of time for sound signals represented by the lines 113 may be the first period in each horizontal line.

Figure 11:
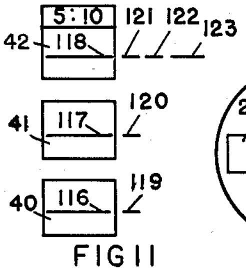

Figure 11 indicates the different periods of time for the several different signals when the different image fields are scanned simultaneously, as described in connection with Figure 4. The numerals 40, 41 and 42 may represent the image screens as shown in Figure 4, and each of the lines 116, 117, and 118 may represent the period of time for picture signals in their associated image fields during simultaneous line scanning of the three image fields. The lines 119, 120, and 121 may represent the same period of time for different sound signals occurring at different locations in the scene being televised. Line 122 may represent the period of time for sound signals representative of weather reports, etc., and line 123 may represent the period of time for the horizontal trigger or synchronizing signals. The images of the clock are indicated only at the top of image screen 42.

From the above description it is seen that picture signals and fragmentary portions of a number of other message signals may be modulated in successive rotation on one or more carrier waves. The horizontal line deflection may be at a relatively high frequency, which causes the sound and other signals to be interrupted at the same rate. The rate of interruption is relatively high and near or above audibility, so that the interruptions will not cause objectionable interference in the sound reproduction.

With reference to Figure 12 the apparatus and associated circuits 29 for producing horizontal sweep voltages comprises a condenser 125 charged through an adjustable resistor 126 from a source of positive potential, as indicated. By movement of the switch 127 another condenser 128 may be charged through resistor 126 to vary the line frequency for horizontal deflection. Further line frequency adjustments may be obtained by providing other resistors and condensers.

When the condenser 125 becomes charged, the sawtooth voltage wave in the plate circuit of trigger tube 129 is impressed on the grids 130 and 131 of multi-unit tubes 132 and 133 through adjustable contacts on resistors 134 and 135. The double anode output of the amplifier 132 at the load resistors 136 and 137 will change the potential on the horizontal deflecting plates 138 and 139 of tube 1 to effect in a well known manner the horizontal movement of the electron ray. Through switches 140 and 141 the horizontal deflecting plates of tube 1 may be disconnected and the horizontal deflecting plates of the tubes 37, 38, and 39 may be connected in parallel to the load resistors 136 and 137 for deflecting the electron rays in the three tubes of Figure 4 at the same time.

The double anode output of the amplifier 133 at load resistors 142 and 143 will change the potential on the horizontal deflecting plates 144 and 145 of the cathode ray period selector tube 146 to cause horizontal deflection of the electron ray across the several anodes. The tube 146 is represented as being in the form of a cathode ray tube of conventional type except that in place of an image screen it may be provided with four anodes, each of which may be connected to a load resistor. As the electron ray is deflected across the anodes 147, 148, and 149 voltage changes are produced at the load resistors 150, 151, and 152 which may be applied over conductors 89, 90, and 91 to control the apparatus and circuits of Figure 8 as previously explained. The rate of deflection of the electron ray in tube 146 may be adjusted at resistor 135 or 153 slower than the rate of deflection in tube 1, so that picture signals may be produced in tube 1 as the electron ray is deflected across the anode 147, and sound signals for two different messages transmitted during the time that the electron ray is deflected across the anodes 148 and 149. As the electron ray is deflected to the anode 154, a voltage drop is developed at load resistor 155, which is applied to the grid 156 in tube 157 to produce a relatively high voltage trigger impulse at load resistor 158. The trigger impulse may be applied over conductor 159 to the grid of tube 129, thereby rendering this tube conductive to discharge the condenser 125, thus returning the electron rays in the tubes 1 and 146 to start the next forward deflection. The horizontal trigger impulse may be applied over conductor 160 to the modulation amplifier 31 in Figure 8 for transmittal, and applied over conductor 161 to the grid of the slow acting glow tube 162. This latter tube was described in my application, Serial Number 541,941, filed June 24, 1944. Briefly the positive trigger impulse applied to the grid causes the fluorescence coated anode 163 of relative slow decay to glow for a short period of time after the duration of the trigger impulse on the grid. Therefore, the photo cell unit 164 actuated by the brilliancy of the anode 163 causes a voltage drop at load resistor 165 of longer duration than the trigger impulse. The voltage drop at resistor 165 may be applied over conductor 98 to the circuits in Figure 8 to block transmission of message signals during the backward deflection of the electron ray as previously described. The voltage drop at load resistor 165 may also be applied over conductor 166 to the grid 167 of multi-unit tube 168 to permit current to flow through its second anode circuit causing a voltage drop at load resistor 169. The voltage drop at resistor 169 may be applied to the control electrode in tube 1 extinguishing its electron ray during retrace or during the time that the line sawtooth voltage is restored to the starting point for the next sawtooth wave. As the electron ray in tube 146 is deflected across the anodes 148 and 149, the negative impulses on conductors 90 and 91 are applied to the grid 167 in tube 168 to extinguish the electron ray in tube 1 during the transmitting periods for sound signals.

From the foregoing it will be understood that the tube 146 initiates the control impulse for terminating the line sawtooth waves at the transmitter and for modulating the carrier wave with a high amplitude signal after the termination of each group of signals comprising picture signals and fragmentary portions of sound signals for two different messages. Furthermore, line frequency may be varied to meet any operating condition.

The apparatus and associated circuits 30 for producing vertical sweep voltages may be similar to the apparatus and circuits described above for producing horizontal sweep voltages, and comprises a condenser 170 charged through an adjustable resistor 171 from a source of positive potential as indicated. By operation of the switch 172 another condenser 173 may be charged through the resistor 171 to vary the field frequency. When the condenser 170 becomes charged the sawtooth voltage wave in the plate circuit of trigger tube 174 is impressed on the grid 175 of multi-unit tube 176 through an adjustable resistor 177. The double anode output of tube 176 through the load resistors 178, 179, 180, and 181 will change the potential on the vertical deflecting plates 182 and 183 of tube 1 to effect the vertical movement of the electron ray. Through switches 184 and 185 the vertical deflecting plates of the tubes 37, 38, and 39 may be connected in parallel to the load resistors 179 and 181 for vertically deflecting the electron beams in the three tubes at the same time.

To initiate the discharge of condenser 170, I provide an off and on relay tube 186 having its deflecting electrode 187 connected to the load resistor 180. As the vertical sawtooth voltage increases to a suitable amplitude to cause the cathode ray to travel vertically over the screen, the electrode 187 becomes more negative rotating the electrons from the anode 188 to produce a voltage impulse at load resistor 189. This positive voltage impulse may be applied to the grid of trigger tube 174 rendering this tube conductive discharging the condenser 170 to return the cathode ray to start the first line in the next field. The positive impulse at load resistor 189 may be applied to the interlace apparatus shown in block diagram at 190 for causing the horizontal deflection of the electron ray at substantially the mean value of the deflecting potential for the first line in alternate fields, so that only odd numbered lines are scanned in alternate fields. The interlace apparatus and circuits 190 may be similar to the equipments in my applications, Serial Number 476,897 or Serial Number 542,317, and further description is not thought to be necessary in this application. The trigger impulse produced at load resistor 189 may be applied over conductors 191 and 160 to the modulation amplifier, and also to the deflecting electrode 192 in tube 186 to cause a voltage drop at load resistor 193. The voltage drop at resistor 193 may be applied to the grid 194 in tube 157 to produce a positive impulse at the common load resistor 158 which may be applied at the same time to conductor 160 as the positive impulse from resistor 189 to modulate the carrier wave with a high amplitude impulse. The horizontal deflection is triggered in unison with the vertical deflection by trigger impulses over conductor 159.

Figure 13:
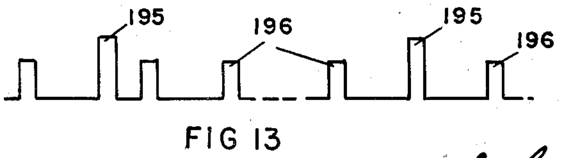

The field control signals or impulses may be of higher amplitude than the line control signals or impulses as illustrated in Figure 13 where 195 may represent the field control or synchronizing impulses and 196 may represent the line control or synchronizing impulses.

From the above description it is to be understood that a vertical control impulse may be produced at the end of each field deflection to initiate both the vertical and horizontal retrace, to extinguish the electron ray during retrace, and to modulate the carrier wave with groups of line signals separated by field signals. Furthermore, line and frame frequencies may be varied to meet any operating condition.

In the transmitters shown in Figures 1 and 4 the line and field sawtooth waves for deflecting the electron ray in bidimensional directions may be triggered or controlled by impulses produced at the transmitter. These impulses may be transmitted to synchronize the scanning actions at the receiving stations. These transmitters may also be used in satellite or private television systems where the station is owned by store or theater managements primarily for showing their productions to patrons. It may be desirable for advertising purposes to rebroadcast store scenes or short runs of the moving picture films showing in a theater from the private television system over a main or community broadcasting station. Under such conditions the transmitter may be controlled by synchronizing signals from the main broadcast station instead of being the controlling station. In this way different line and field frequencies may be used for private business with no possibility of reproduction on conventional home receivers using television standard synchronizing signals to rebroadcast its own productions, which method is to be explained in more detail later.

Assume first that the main or community broadcasting station and the satellite station or private television system are using transmitters as described in Figure 1 or 4 and using the synchronizing signals as shown in Figure 13. Then a receiver at the satellite station would be tuned to receive signals from the main station that will later retransmit the the pictures from the satellite station. From the receiver the line and field synchronizing impulses may be applied over the conductors 36. The line impulses may be applied through switch 197 to the grid 198 of tube 199 causing a voltage drop at load resistor 200. The negative impulses produced at resistor 200 may be applied through the switch 201 to the grid 156 of tube 157, thereby triggering tube 129 as previously described. The field impulses may be applied through the switches 202 and 203 to the grid of trigger tube 174 to cause the vertical backward deflection of the electron ray. The field control impulses may also be applied to the grid 204 in tube 199 causing a voltage drop at resistor 205. The negative impulse produced at resistor 205 may be applied through the switch 206 to the grid 194 of tube 157 to cause horizontal deflection simultaneously with the vertical deflection as explained above.

Figure 14:
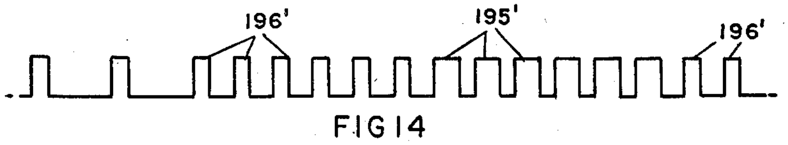
Figures 13 and 14 are graphical views illustrating horizontal and vertical control signals.

Now assume that the main broadcasting station is employing the standard synchronizing signals as illustrated in Figure 14, where 195′ may represent the field and 196′ the line signals. From the receiver at the private televsion system the line and field trigger pulses may be applied over the conductors 36 through switches 197 and 202 to trigger line and field deflection as explained above. But preferably the line trigger pulses are applied through switch 197 to the blocking oscillator 207. The grid 130 in the push-pull amplifier 132 is connected through switch 207′ to the oscillator 207. The field trigger pulses are applied through switch 202 to the blocking oscillator 208. The oscillator 208 is to replace the apparatus in the dash line enclosure 208′ by actuation of switch 209. Switch 206 would be open to prevent line retrace with field retrace, and the conductor 160 would be open at switch 210 to prevent the modulation of the carrier wave produced at the satellite station with received trigger pulses. The electron ray in tube 146 would be deflected as described above to allot different periods of time to different sets of signals.

Figures 15, 20, 27:
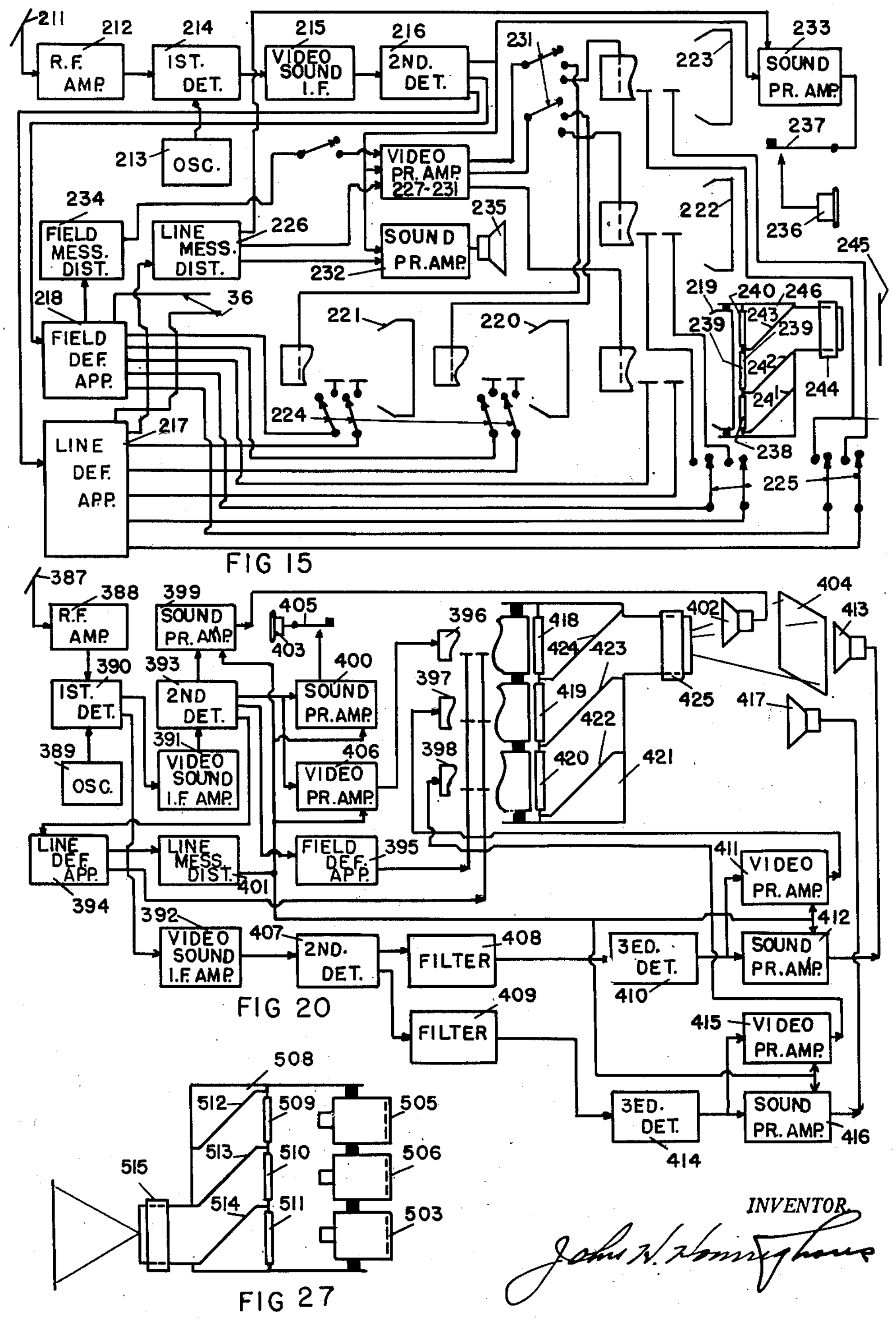
Figures 15 and 20 are simplified block diagrams of television receiving stations employed in this invention.

In Figure 15, which shows a receiving station for reproducing colored pictures by line or field sequential scanning, the antenna 211 receives the modulated carrier wave from the transmitting antenna 34, Figure 1, or from the antenna 85 Figure 4, to radio frequency amplifier 212. An oscillator 213 reacts with these signals in the first detector stage 214 to produce intermediate frequency signals which may be supplied to the intermediate frequency stages 215. After suitable amplification in stages 215, the video signals, sound signals and synchronizing signals are demodulated at 216. The control or synchronizing signals being of greater amplitude are separated and fed to the line and field deflecting apparatus and associated circuits 217 and 218 to control thereby the scanning actions in the projecting tube 219 by scanning a line at a time in different image field location on the tube screen in sequence or by scanning the different image field locations in sequence. To scan a line at a time on the screens of projecting tubes 219, 220, and 221 the switch 224 may be operated to connect the deflecting plates in tubes 220 and 221 to the line and field deflecting apparatus 217 and 218. To scan different tube screens in sequence for the tubes 219, 222, and 223 the switch 225 may be operated to connect the deflecting plates in tubes 222 and 223 to the line and field deflecting apparatus 217 and 218. From the second detector 216 the video signals and sound signals may be fed to the video signal power amplifier 227 and sound signal amplifiers 232 and 233 when only one projecting tube 219 is used, which amplifiers may be under the control of the line message distributor 226 for allotting different periods of time for video signals and for sound signals of two different messages. The video and sound signals may be fed to the video signal power amplifiers 227, 228, and 229, and sound signal amplifiers 232 and 233 when three projecting tubes are used with line sequential scanning. The video and sound signals may be fed from the sound detector 216, under the control of the line message distributor 234 for allotting different periods of time for video signals and for sound signals of two different messages, when three projecting tubes are used with field sequential scanning. The video signals may be fed to the power amplifiers 227, 230, and 231 and the sound signal may be fed to the amplifiers 232 and 233. The line and field message distributors are controlled by sawtooth potentials received from the deflecting apparatus 217 and 218.

Sound signals representative of the messages accompanying the pictures supplied to the power amplifier 232 may actuate the lound speaker 235, or the loud speaker may be replaced with a light valve similar to that shown in Patent 2,409,433, issued October 15, 1946, or a glow lamp, as shown in application Serial Number 541,941, filed June 6, 1944, for recording sound signals on a film. Sound signals representative of weather and time of day reports supplied to the power amplifier 233 may actuate the small receiver 236. By holding the receiver to the ear and operating the switch or key 237 weather and time of day reports may be received without interfering with the reception at the speaker 235. The projecting tubes 219 through 223 are represented as being in the form of cathode ray tubes, each comprising a fluorescence screen, and an electron ray directed toward its associated screen and two sets of deflecting plates for deflecting the electron ray at the line and field frequencies to cause it to scan its screen.

Since picture signals may be produced from three images per field at the transmitter, there may be three similar images reproduced on the screen of the projecting tube 219. In front of these images there may be colored filters, blue 238, red 239 and green 240. Light rays from the tube screen directed through the filter 238 may be reflected at the opaque mirror 241 through the back of the partially silvered mirror 242 (some of the rays being lost) and reflected at right angles from the reflecting surface of the partially silvered mirror 243 to the projecting lens system indicated at 244. Light rays from the tube screen directed through the red filter 239 may be reflected from the reflecting surface of the partially silvered mirror 242 toward mirror 243; rays passing through mirror 242 are lost, and some of the rays reaching the partially silvered mirror 243 are passed through and lost, and other rays may be reflected at right angles by the mirror 243 to the lens system 244. Light rays directed through the green filter 240 are passed in part through the mirror 243 to the projecting lens system 244. The three colored images may be superimposed on a large screen 245 to show a complete colored picture. The three images may be projected to the screen 245 in proper alignment by adjustment of the mirrors in compartment 246 and by the proper selection of sawtooth potentials in the circuits of apparatus 217 and 218. While I have shown the tube compartment 246 associated with the projecting tube 219, it is to be understood that this tube compartment 246 with lens system 244 may be used with either set of the three projecting tubes described above as illustrated in Figure 20.

Figure 16:
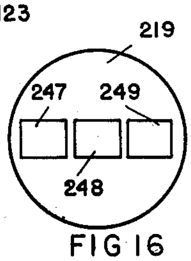
Figure 16 shows a modification of a viewing tube screen.

In Figure 16 I have shown the screen of tube 219 with three separate areas, each area having a different colored phosphor so that the color filters 238, 239, and 240 may be eliminated in the tube compartment 246, Figure 15. The area 247 may be green, area 248 may be red and the area 249 may be blue. Signals from the transmitter shown in Figure 4 may be received at the receiving station, Figure 15, where only the main carrier wave is demodulated to produce monochrome pictures.

Figure 17:
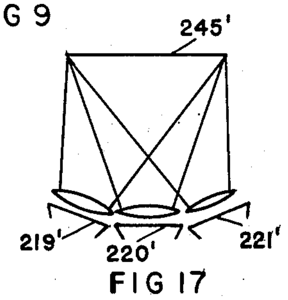
Figure 17 shows cathode ray tubes for projecting images to a distant screen.

Either set of the three projecting tubes shown in Figure 15, set 219, 220, and 221 or set 219, 222, and 223 may have colored image screens and an individual lens system for each tube to project or superimpose the different images on a distant screen as illustrated in Figure 17, where the tube 219′ may have a green colored screen, tube 220′ may have a red screen and tube 221′ may have a blue screen for superimposing the colored images to the distant screen 245′.

Figure 18:
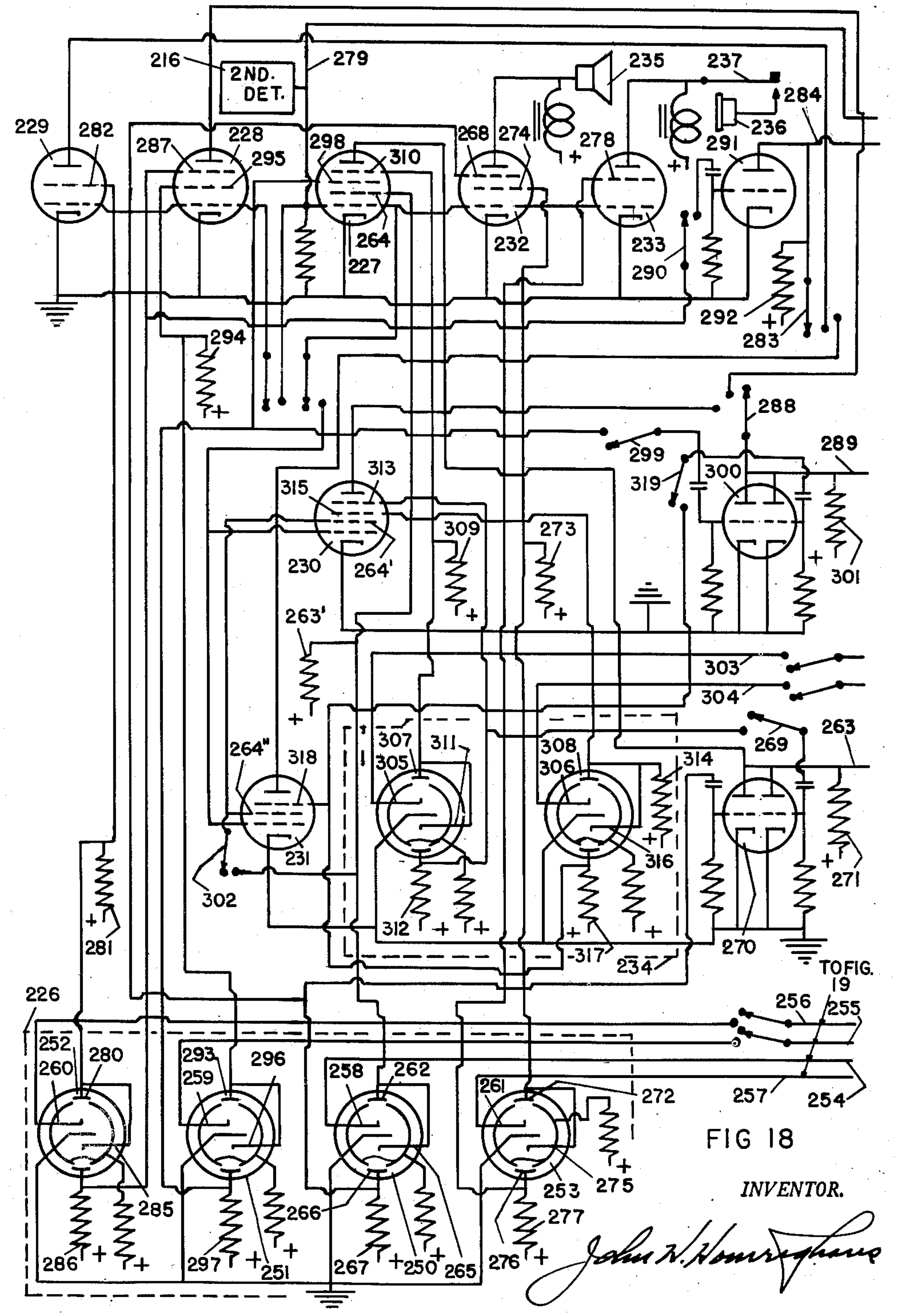
Figure 18 is a circuit diagram showing the message distributor illustrated in Figure 15.

With reference to Figure 18 the line message distributor 226 for allotting suitable periods of time in the interval of a sawtooth wave for several messages received over a common carrier wave comprises four off and on relay impulse tubes 250 through 253, for controlling the power amplifiers 227 through 233. The tubes 250 through 253 are controlled by sawtooth potentials developed in the line deflecting apparatus and associated circuits of Figure 19 and applied over conductors 254 through 257 to the control electrodes 258, 259, 260, and 261. The sawtooth potentials on the several control electrodes may be adjusted for different operating conditions in the circuits of Figure 19.

Assuming first that only one projecting tube 219 is used, then the power amplifiers 228, 229, 230, and 231, and the relay tubes 251 and 252 and the field message distributor 234 may be disconnected. As the sawtooth potential produced in the circuits of Figure 19 increases, the potential supplied to the control electrode 258 may increase to permit the electrons to flow to the anode 262 at the time the electron ray in tube 219 reaches the leaving edge of the screen image; thus received picture signals from the detector 216 supplied to the control grid in the power amplifier 227 may be amplified in this tube and fed over conductor 263 to the control electrode of the projecting tube 219, Figure 19, during the line trace period of the electron ray.

As soon as current flows through the anode 262 and the load resistor 263′, a voltage drop is developed at resistor 263′ and applied to the grid 264 to render tube 227 inoperative to any further signals applied to its control grid during further increases in the sawtooth potential, or during the time that sound signals and control signals are being received on the carrier wave. The potential drop at resistor 263′ is also applied to the control electrode 265 which may block or rotate the electrons from the anode 266, thereby increasing the potential at load resistor 267 and to the grid 268, thus permitting sound signals from the detector 216, which is supplied to the control grid of the power amplifier 232 to be fed to the loud speaker 235, immediately after the reproduction of the picture signals. The increase potential at resistor 267 is also supplied to the first control grid of tube 270 to cause a voltage drop at the load resistor 271 which is supplied over conductor 263 to blank the cathode ray tube during sound signal reception. A short period of time after the reception of sound signals related to the pictures the sawtooth voltage on control electrode 261 will have increased to permit current to flow through the anode 272 and load resistor 273 to produce a potential drop at resistor 273 and the grid 274, thus blocking tube 232 to any signals on its control grid during further increase in the sawtooth potentials. The drop in potential at resistor 273 is also applied to the control electrode 275 blocking current flow through the anode 276 and load resistor 277, thereby causing grid 278 to become more positive. Positive potential on grid 278 permits other sound signals, representative of reports, from the detector 216 applied to the control grid of the power amplifier 233 to be fed to the reproducer 236.

Figure 19:
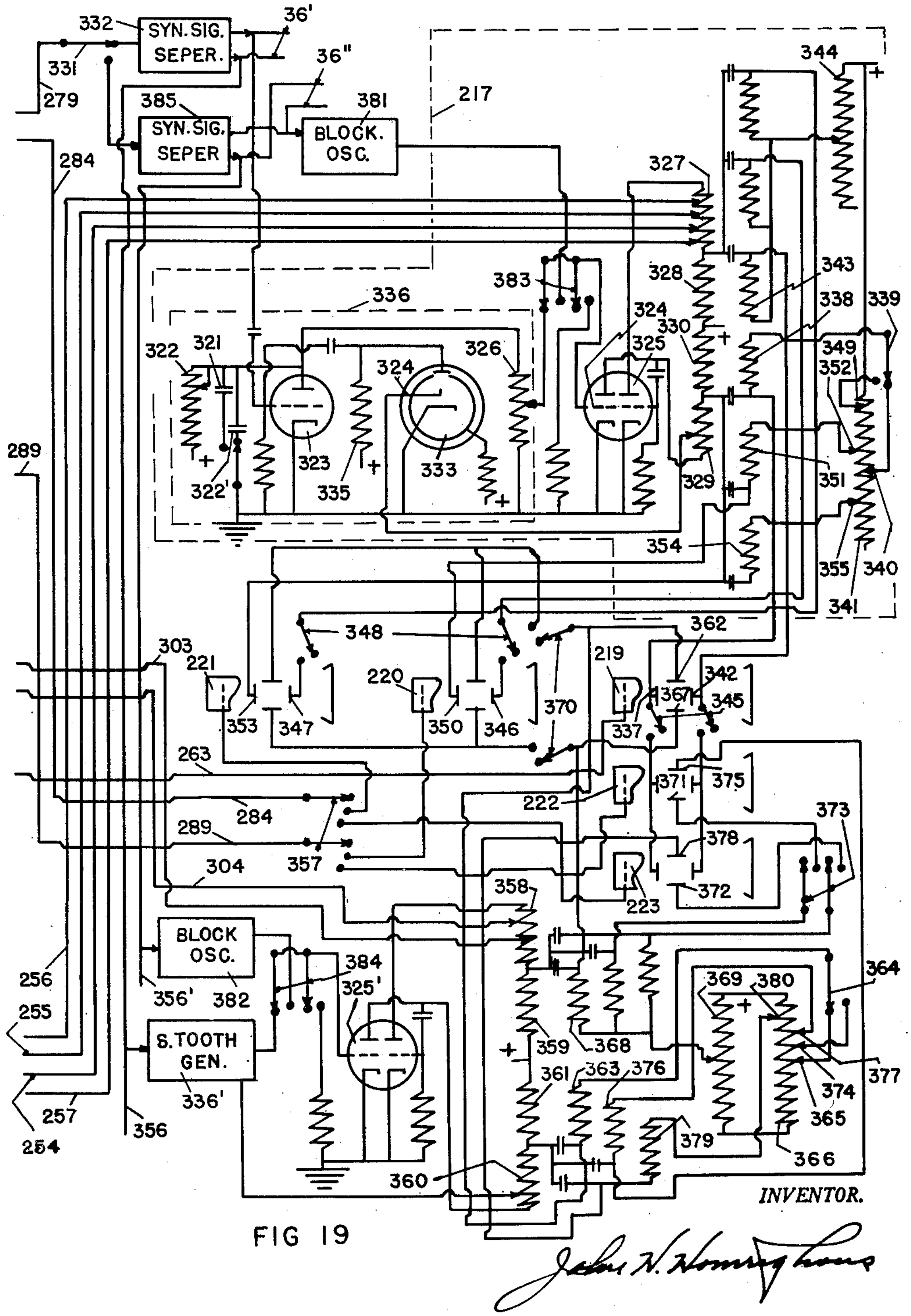
Figure 19 is a circuit diagram showing the horizontal and vertical deflecting apparatus illustrated in Figure 15.

After a short period of time for reception of sound signals through amplifier 233, control or synchronizing signals from the detector 216 are fed over conductor 279 to the circuits of Figure 19 to control or trigger the sawtooth voltages and restore the circuits of Figure 18 to start reception of another group of signals comprising picture signals and sound signals for two different messages.

From the above description it is to be understood that the cathode ray tube 219 may have three different image areas either in a horizontal row for scanning a line at a time in the different areas, or the three image areas may be in a vertical row for scanning the image fields in sequence.

Assume secondly that three projecting tubes 219, 220, and 221 are used by scanning a line at a time on the different tube screens in sequence. Then the power amplifiers 228 and 229 and the off-and-on relay tubes 251 and 252 would be utilized in addition to the equipment described above for one projecting tube. A short period of time after the sawtooth potential in the circuits of Figure 19 starts to bulid up or after each line retrace, the increasing potential applied over conductor 256 to the control electrode 260 causes current to flow through the anode 280 and load resistor 281. The voltage drop at resistor 281 may be supplied to the grid 282 in the power amplifier 229 to block signal amplification therein, immediately after the electron ray in tube 221 reaches the leaving edge of its image screen, so that received picture signals supplied to the control grid in the power amplifier 229 may be amplified and fed through switch 283 and over conductor 284 to the control grid in the projector tube 221, Figure 19, during the line trace period of its electron ray. The potential drop at resistor 281 may be supplied to the control electrode 285 to block current flow through the load resistor 286, thereby increasing the potential of grid 287, which renders tube 228 conductive to video signals supplied to its control grid. The video signals after amplification in the power amplifier 228 may be fed through the switch 288 and over the conductor 289 to the control grid of the projector tube 220 during the line trace period of its electron ray. The increase potential at load resistor 286 may also be supplied through the switch 290 to the grid of tube 291 causing a voltage drop at load resistor 292 which may be fed over the conductor 284 to blank or extinguish the electron ray in tube 221 during further increases in the sawtooth potential.

As the sawtooth potential continues to increase, the potential on conductor 255, after the line trace period in tube 220, may cause current to flow through anode 293 and load resistor 294. The voltage drop at resistor 294 may be supplied to the grid 295 rendering the power amplifier 228 non-conductive to further video signals. The voltage drop at resistor 294 may also be supplied to the control electrode 296 causing an increase in potential at load resistor 297 and the grid 298 in the power amplifier 227 rendering this tube conductive to picture signals supplied to its control grid. The increased potential at load resistor 297 may also be supplied through switch 299 to the first grid of tube 300 causing a voltage drop at load resistor 301, thereby extinguishing the electron ray in tube 220.

The power amplifiers 227, 232, and 233 may be controlled for the reception of picture and sound signals as described above in connection with projecting tube 219 and further description here is not thought to be necessary.

Now assume that the three projecting tubes 219, 222, and 223 are used by scanning an image field at a time on the different tube screens in sequence. Then the power amplifiers 228 and 229 and the relay tubes 251 and 252 would be disconnected or renderd non-operative, and the power amplifiers 230 and 231 and the relay tubes comprising the field message distributor 234 would be included with the equipment described above in connection with projection tube 219.

Video signals from the detector 216 supplied to the control grids of the power amplifiers 227, 230, and 231 are fed to the projecting tubes 219, 222, and 223 in sequence during the first periods in the line sawtooth waves produced in the circuits of Figure 19.

Sound signals from the detector 216 supplied to the control grids of the power amplifiers 232 and 233 are fed to the speakers 235 and 236 during the second and third periods in the line sawtooth waves, as explained above, and further description for the selection of sound signals is thought to be unnecessary.

The method of operation for controlling the power amplifiers 227, 230, and 231 to allot the first period of time in the line sawtooth waves to video signals is the same as previously described for the amplifier 227. Grid 294 in amplifier 227 may be connected through switch 302 to similar grids in the amplifiers 230 and 231 having like reference numerals primed, so that all three amplifiers 227, 230, and 231 are rendered non-conductive at the end of the first or picture period in each sawtooth wave.

To supply each projecting tube 219, 222, and 223, Figure 19, with picture signals in sequence different values of the increasing potentials are selected in each field sawtooth wave produced in the circuits of Figure 19 and supplied over conductors 303 and 304 to the control electrodes 305 and 306 in the off-and-on relay tubes 307 and 308 respectively. As the electron ray in tube 219 reaches the field leaving edge of its image screen, the potential on control electrode 305 may be adjusted to permit current flow through the load resistor 309 causing a voltage drop on the grid 310 in tube 227, thereby rendering this tube nonconductive to any further signalling current on its control grid during the time that tubes 230 and 231 may be conductive to signalling currents. The voltage drop at the load resistor 309 may also be applied to the control electrode 311 increasing the potential at load resistor 312 and the grid 313 in amplifier 230, thus rendering tube 230 conductive to video signals applied to its control grid. These signals may be fed to the control grid in projecting tube 222 through switch 288 and over conductor 289. The increased potential at the load resistor 312 may be supplied through switch 269 to the second grid in tube 270 causing a voltage drop at the common resistor 271 to extinguish substantially the electron ray in projecting tube 219 during further increases in the field sawtooth potential.

When the electron ray in projecting tube 222 reaches the field leaving edge of its image screen, the potential on control electrode 306 may be adjusted to permit current flow through the load resistor 314 causing a voltage drop on the grid 315 in tube 230, thereby rendering this tube nonconductive to further signalling current on its control grid or during the time that tube 231 may be conductive to signalling currents. The voltage drop at the load resistor 314 may also be applied to the control electrod 316 increasing the potential at the load resistor 317 and the grid 318 in amplifier 231, thus causing tube 231 to become conductive to video signals applied to its control grid. After amplification in tube 231 the signals may be fed through switch 283 and over conductor 284 to the control grid in the projecting tube 223. The increase potential at the load resistor 317 may also be supplied through switch 319 to the second grid in tube 300 causing a voltage drop at the common resistor 301 to blank the electron ray in projecting tube 222 during further increases in potential for the field sawtooth waves.

As the electron ray in the projecting tube 223 reaches its field leaving edge, a field trigger pulse received from a transmitting station may be supplied from detector 216 over the conductor 279 to restore the field sawtooth potentials in Figure 19 and restore the circuits of Figure 18 to start another series of picture signals through the amplifiers 227, 230, and 231 in sequence.

With reference to Figure 19, which connects to Figure 18, the apparatus and associated circuits 217 for deflecting horizontally the electron ray in one or more projecting tubes and for producing the sawtooth potentials to control the circuits of Figure 18 comprise a condenser 321 charged through an adjustable resistor 322 from a source of positive potential as indicated. Another condenser 322′ may be employed to change the charging rate.

When the condenser 321 becomes charged, the sawtooth voltage wave in the plate circuit of tube 323 is impressed on the grid 324 of multi unit tube 325 through an adjustable contact on the resistor 326. The double anode output of the amplifier 325 supplied to the load resistors 327 through 330 may change the potential on the line or horizontal deflecting plates in one or more of the projecting tubes to cause electron ray deflection in the tubes. The interval of increasing potential in each sawtooth wave may comprise one or more periods for video signal reception and other periods for sound signal reception.

Line and field or frame synchronizing signals received over conductor 279 through switch 331 may be separated in the synchronizing signal separating stage 332, as described in Patent Number 2,398,641. Line and frame control or synchronizing signals may be applied to the grid of trigger tube 323 rendering this tube conductive to discharge the condenser 321, thereby deflecting the electron ray in the projecting tube backward to the starting point for scanning the next line and to condition also the circuits of Figure 18 for the reception of another series of video and sound signals. To trigger tube 323 when no synchronizing signals are being received I have provided an off-and-on relay tube 333 having its control electrode 334 connected to load resistor 329. The voltage drop produced at 329 and supplied to the electrode 334 may block current flow through the tube 333 and the load resistor 335, at the end of a series of video and sound signal reception, to produce a positive impulse at the resistor 335. This impulse may be supplied to the grid of trigger tube 323 rendering the tube conductive to discharge the condenser 321.

The sawtooth generator described above in connection with the tubes 323, 325, and 333 has been enclosed in a dash line block 336 to simplify the description later on for other similar sawtooth generators.

Where projecting tube 219 only is used the line deflecting plate 337 may be connected through resistor 338, switch 339 and adjustable contact 340 on the centering resistor 341, and the other line deflecting plate 342 may be connected through resistor 343 to another centering resistor 344, so that the electron ray may travel forward and backward across the tube screen.

Where three projecting tubes are used with field sequential scanning the horizontal or line deflecting plates in tubes 222 and 223 may be connected in parallel to the line deflecting plates in tube 219 through the switch 345.

Where the three projecting tubes 219, 220, and 221 are used with line sequential scanning, or scanning a line at a time on each of the tube screens in sequence, each line sawtooth wave may comprise three scanning periods, a first period to scan a line on the screen of tube 221, a second period to scan a like numbered line on the screen of tube 220, and a third period to scan a similarly numbered line on the screen of tube 219. The line deflecting plates 346 and 347 in tubes 220 and 221 may be connected through switch 348 to the same potential at resistor 344 as the potential on the line deflecting plate 342 in tube 219. Deflecting plate 337 may be connected through resistor 338, switch 339, and contact 349 for high positive potential relative to the potential on the deflecting plate 342, so that the electron ray, extinguished during the first and second periods, may start to scan the screen on tube 219 at the beginning of the third period. Line deflecting plate 350 may be connected through resistor 351 and contact 352 for medium high positive potential relative to the potential on the deflecting plate 346, so that the electron ray, in tube 220, extinguished during the first and third periods, may start to scan its associated screen at the beginning of the second period. Line deflecting plate 353 may be connected through the resistor 354 and contact 355 for positive potential slightly higher than the potential on the deflecting plate 347 so that the electron ray may start to scan the screen of tube 221 at the beginning of the first period. Different potentials may be supplied to the deflecting plates 342, 346 and 347 through their associated resistors by utilizing different contacts on resistor 344.

Voltage changes in the load resistor 327 may be supplied over conductors 254 through 257 to control the circuits of Figure 18 as previously explained.

Video signals supplied over conductors 284 and 289 from the circuits of Figure 18 may be routed through the switch 357, either to the projecting tubes 220 and 221 for line sequential scanning or to the projecting tubes 222 and 223 for field sequential scanning.

The apparatus and associated circuits for deflecting vertically the electron ray in one or more projecting tubes and for producing sawtooth potentials to control the circuits of Figure 18 comprise a sawtooth generator 336′ similar to the sawtooth generator 336 described above. Field or vertical synchronizing signals from the stage 332 may be applied to the grid of the trigger tube in the generator 336′, thereby causing backward vertical deflection of the electron ray in one or more projecting tubes.

The sawtooth output of generator 336′ may be supplied to the load resistors 358 through 361 to change the potential on the field or vertical deflecting plates in one or more of the projecting tubes. The interval of increasing potential in each field sawtooth wave may comprise one or more periods for video signal reception.

Where projecting tube 219 only is used, the field deflecting plate 362 may be connected through resistor 363, switch 364, and adjustable contact 365 on the centering resistor 366, and the other field deflecting plate 367 may be connected through resistor 368 to another centering resistor 369, so that the electron ray may travel forward and backward vertically over the tube screen.

Where three projecting tubes are used with line sequential scanning, the field or vertical deflecting plates in tubes 220 and 221 would be connected in parallel to the field deflecting plates in tube 219 through the switch 370.

Where the three projecting tubes 219, 222, and 223 are used with field sequential scanning, or scanning one tube screen after another in sequence, each field sawtooth wave may comprise three scanning periods, a first period to scan the image screen on tube 219, a second period to scan the image screen on tube 222 and a third period to scan the image screen on tube 223.

The field deflecting plates 371 and 372 in tubes 222 and 223 may be connected through switch 373 and their associated resistors to the same potential at resistor 369, as the potential on the field deflecting plate 367 in tube 219. Deflecting plate 362 may be connected through resistor 363, switch 364, at slightly higher potential at contact 374 relative to the potential on plate 367, so that the electron ray in tube 219, extinguished during second and third periods, may scan the screen in tube 219 during the first period. Deflecting plate 375 may be connected through resistor 376 for medium high potential at contact 377 relative to the potential on deflecting plates 371, in order that the electron ray, extinguished during the first and third periods, may scan the screen in tube 222 during the second period. The field deflecting plate 378 may be connected through the resistor 379 for high potential at contact 380 relative to the potential on the deflecting plate 372 so that the electron ray, extinguished during first and second scanning periods, may scan the screen in tube 223 during the third period. When desired different potentials may be supplied from different contacts on resistor 369 to the field deflecting plates 367, 371, and 372 through their associated resistors, such as 368.

Voltage changes in load resistor 358 may be supplied over the conductors 303 and 304 to control the circuits of Figure 18 as previously explained.

In order to operate this receiver from the present standard synchronizing signals, as illustrated in Figure 14, rather than the synchronizing signals as illustrated in Figure 13, the sawtooth generators may be replaced by blocking oscillators 381 and 382 through operation of the switches 383 and 384. The synchronizing signals at detector 216 may be supplied over conductor 279 through switch 331 to the signal separating apparatus 385 comprising differentiating and integrating circuits to supply line synchronizing signals to the line oscillator 381 and field synchronizing signals to the field oscillator 382 to synchronize the scanning actions at the receiver with the scanning actions at the transmitter.

The transmitter in Figure 1 and the receiver in Figure 15 may be used in a private or satellite station. At the satellite receiver, line and field control signals may be intercepted and supplied to the signal separating stage 332 to synchronize the receiver with a distant transmitter. These signals may be supplied from the stage 332 over conductors 36′ to the transmitter, Figure 1, at the private station to control the scanning actions therein. Should the present standard synchonizing signals from a distant station be received at the satellite station and supplied to the stage 385 to synchronize the receiver, the line and field signals from the stage 385 may be supplied over another pair of conductors 36″ to the transmitter, Figure 1, at the private station, or in the circuits of Figure 12 to synchronize the scanning actions at both the transmitter and receiver in the private station with the scanning actions at a distant broadcasting station.

With reference to Figure 20, showing a receiving station for simultaneously scanning three image screens for color reproduction and also for producing stereophonic sound effects, the antenna 387 receives the combined carrier signals from the transmitter antenna 85, Figure 4, to a radio frequency amplifier 388. An oscillator 389 reacts with these signals in the first detector stage 390 to produce two intermediate frequency signals which may be fed to the intermediate frequency stages 391 and 392. After suitable amplification the video signals, sound signals representative of two messages, and line and frame control or synchronizing signals may be demodulated at the second detector 393. The control signals being of greater amplitude are separated and fed to the line and field deflecting apparatus and associated circuits 394 and 395 to control the scanning actions in the cathode ray projecting tubes 396, 397, and 398.

Sound signals from the detector 393 may be fed to the power amplifiers 399 and 400 under the control of the line message distributor 401 to allot suitable periods of time for supplying the signals for different messages to the reproducing devices 402 and 403. The reproducing device or loud-speaker 402 may be located to the left of the distant screen 404, and the reproducing device 403 may be utilized through the operation of key 405 to listen to weather reports and/or other announcements without interfering with the reception on the speaker 402. Video signals, from the detector 393 which may be representative of the screen color in the scene being televised, may be supplied to the power amplifier 406, under the control of the message distributor 401, to allot suitable periods of time in the sweep voltages for supplying the video signals to the projecting tube 396.

Video signals and sound signals representative of the sound from different scene locations, after suitable amplification in stage 392, may be fed to the second detector 407 The output of the detector 407 going to two selective filters 408 and 409. The video and sound signals from filter 408 still in modulated form on a sub carrier wave may be demodulated at the detector 410 with the video signals being supplied to the power amplifier 411 and the sound signals being fed to the power amplifier 412. After suitable amplification in stage 411 under control of the message distributor 401, the video signals representative of the red color in the scene may be fed to the projecting tube 397, and the sound signals after amplification in stage 412 under control of the message distributor may be fed to the loud-speaker 413 located to the right of the distant screen 404.

Video signals and sound signals from the filter 409 still in modulated form on a sub carrier wave may be demodulated at the detector 414 with the video signals representative of the blue color in the televised scene being supplied to the power amplifier 415, and the sound signals being fed to the power amplifier 416. After suitable amplification in stage 415 under control of the message distributor the video signals may be fed to the projecting tube 398, and the sound signals after amplification in stage 416 under control of the message distributor may be fed to the loud speaker 417 located near the center of the distant screen 404.

Picture images may be produced on each of the projecting tubes 396, 397, and 398 representative of a different color in the scene being televised. In front of these tubes there may be color filters green 418, red 419, and blue 420 suitably mounted in the tube compartment 421. The tube compartment 421 may be rotated so that the blue color filter 420 may be in front of tube 396 provided that the image on the tube 396 is representative of the blue color in the televised scene. Light rays from the screen of tube 398 directed through the filter 420 are reflected at the opaque mirror 422 through the back of the partially silvered mirror 423 (some of the rays being lost) and reflected at right angles from the reflecting surface of the partially silvered mirror 424 through the projecting lens system 425 to the distant screen 404. Light rays from the screen of tube 397 directed through the color filter 419 are reflected from the reflecting surface of the partially silvered mirror 423 toward mirror 424, rays passing through mirror 423 being lost. Some of the rays reaching mirror 424 pass through and are lost; other rays are reflected at right angles through the lens system 425 to the distant screen 404. Light rays from the screen of tube 396 directed through the filter 418 are passed in part through the mirror 424 and lens system 425 to the distant screen 404 where the three images are made to coincide to form a complete composite color picture by the adjustment of the mirrors or projecting tubes in the compartment 421.

Each of the loud-speakers 402, 413, and 417 may be replaced with a glow lamp, similar to that shown in application Serial Number 541,941, or a conventional light valve for recording sound signals on a moving picture film, where images on the screens of tubes 396, 397, and 398 are being recorded on the film. The compartment or cover 421 may be removed and a moving picture camera placed in front of each picture tube, which process is to be more fully explained later.

Figure 21:
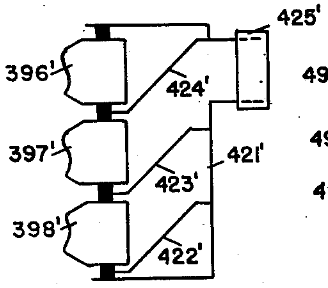

With reference to Figure 21 I have shown a tube compartment 421′ similar to the tube compartment 421 in Figure 20 except that the tube screens may be prepared from colored phosphors doing away with the color filters shown in Figure 20. Light rays from the screens of tubes 398′, 397′, and 396′ may be directed to and passed or reflected by the mirrors 422', 423', and 424' through the lens system 425' as explained above for Figure 20. This compartment 421' may be used for three projecting tubes in Figure 15.

Figure 22:
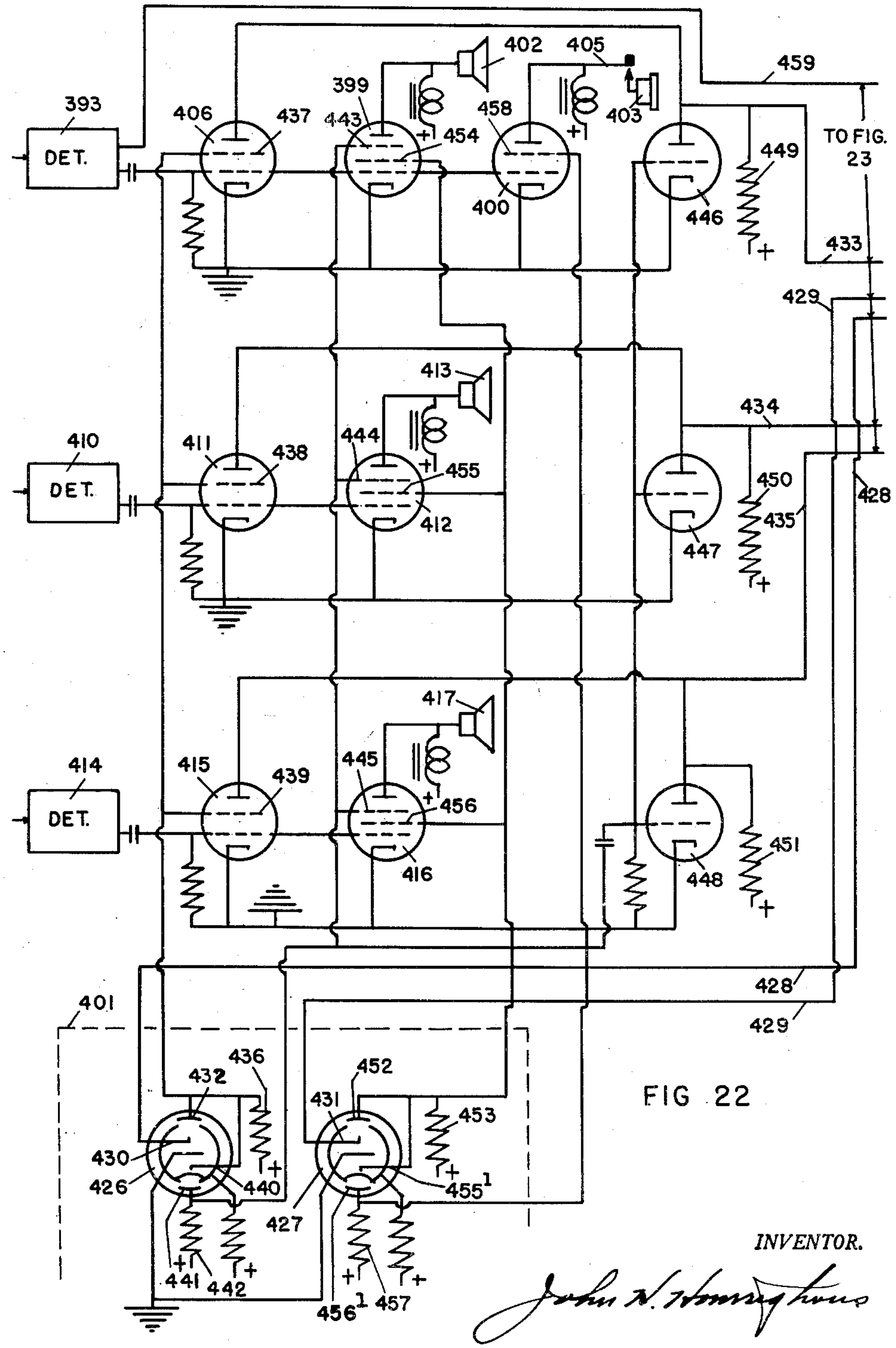
Figures 22 and 29 are circuit diagrams showing different message distributors employed at the receiving station shown in Figure 20.

With reference to Figure 22 the line message distributor 401 for allotting suitable periods of time in the interval of a line sawtooth wave for several messages received over combined carrier waves comprises two off-and-on relay tubes 426 and 427 for controlling the power amplifiers 399, 400, and 406; 411 and 412; and 415 and 416. The tubes 426 and 427 are controlled by sawtooth potentials produced in the line deflecting apparatus and associated circuits of Figure 23 and applied over conductors 428 and 429 to the control electrodes 430 and 431. The sawtooth potentials on the control electrodes 430 and 431 may be adjusted for different operating conditions in the circuits of Figure 23. As the sawtooth potential produced in the circuits of Figure 23 increases, the potential supplied to the control electrode 430 will also increase causing the electrons to flow to the anode 432 at the time the electron rays in the tubes 396, 397, and 398, Figure 23, reach the leaving edge of their associated screens, so that received picture signals from the detectors 393, 410, and 414 supplied to the control grids in the power amplifiers 406, 411, and 415 may be suitably amplified in these power stages and fed over conductors 433, 434, and 435 to the control grids in the projecting tubes 396, 397, and 398 respectively during the line trace period of the electron rays. As soon as current flows through the anode 432 and the load resistor 436, a voltage drop developed at resistor 436 is impressed on the grids 437, 438, and 439 to render the tubes 406, 411, and 415 inoperative to any further signals applied to their control grids during further increases in the sawtooth potential or during the time that sound signals and control signals are being received. The potential drop at resistor 436 is also applied to the control electrode 440 to block or rotate the electrons from the anode 441, thereby increasing the potential at load resistor 442 and to the grids 443, 444, and 445 in the power amplifiers 399, 412, and 416. This permits sound signals from the detectors 393, 410, and 414 supplied to the control grids of the power amplifiers 399, 412, and 416 to be fed to the loud-speakers 402, 413, and 417, immediately after the reproduction of picture signals. The increase potential at resistor 442 is also supplied to the control grids of the tubes 446, 447, and 448 to cause a voltage drop at the resistors 449, 450, and 451. The voltage drop produced at the latter resistors may be applied over conductors 433, 434, and 435 to blank the electron rays in the cathode ray tubes 396, 397, and 398 during sound signal reception. A short period of time after the reception of sound signals related to the pictures, the sawtooth voltage on control electrode 431 will have increased to permit current to flow through the anode 452 and load resistor 453 to produce a potential drop at resistor 453 and the grids 454, 455, and 456, thus blocking tubes 399, 412, and 416 to any signals on their control grids during further increases in the sawtooth potential.

The drop in potential at resistor 453 is also applied to the control electrode 455', blocking current flow through the anode 456' and load resistor 457, thereby causing grid 458 to become more positive. Positive potential on grid 458 permits other sound signals, representative of reports, from the detector 393 applied to the control grid of the power amplifier 400 to be fed to the reproducer 403.

Figures 23, 28:
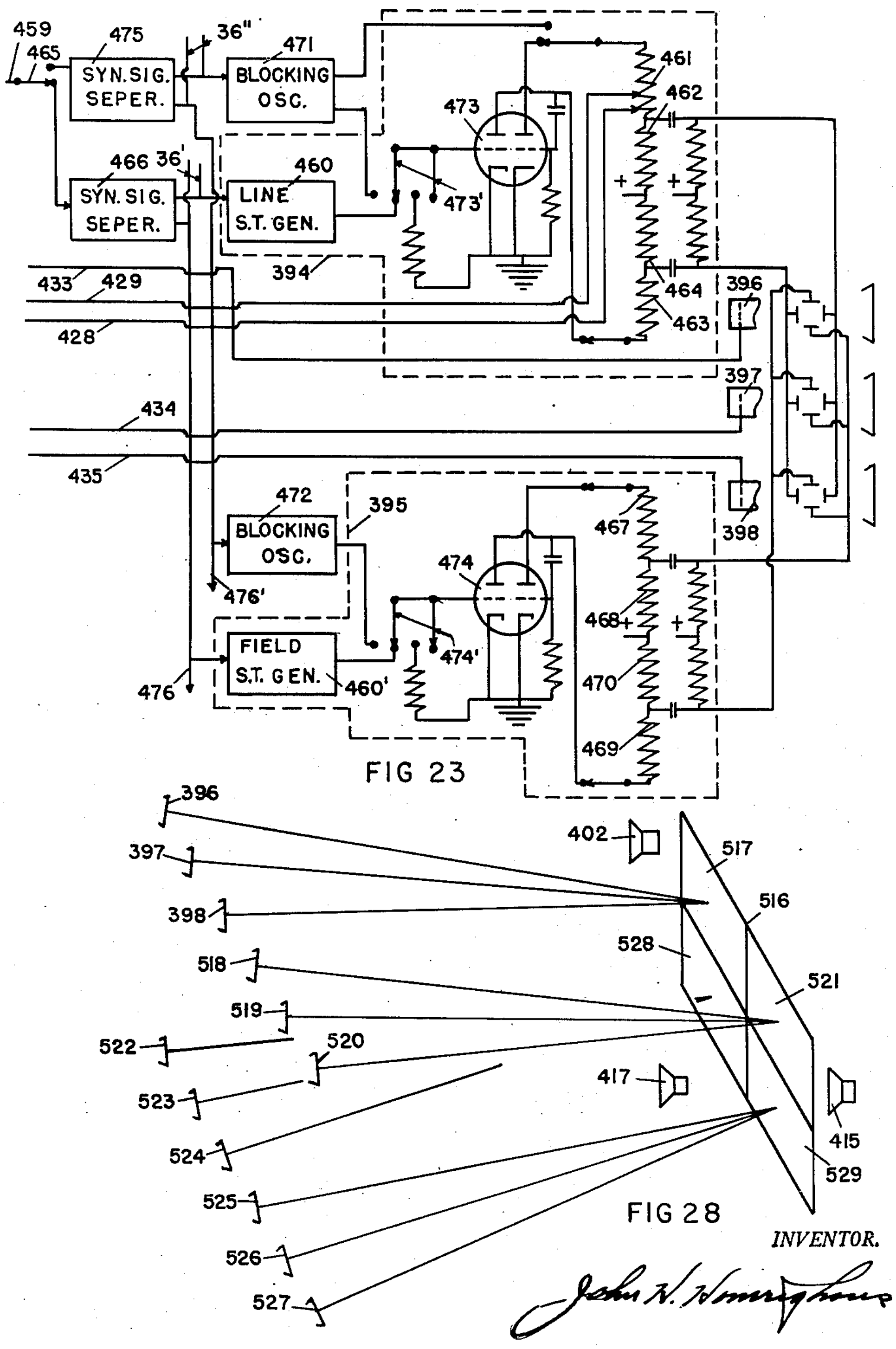
Figures 23 and 30 are circuit diagrams showing different horizontal and vertical deflecting apparatuses employed at the receiving station shown in Figure 20.
Figure 28 illustrates an arrangement of different sets of cathode ray tubes for projecting partial images in color to different sections of a distant screen.

After a short period of time for reception of sound signals through the amplifier 400, control or synchronizing signals from the detector 393 are fed over conductor 459 to the circuits of Figure 23 to control or trigger the sawtooth voltages and restore the circuits of Figure 22 to start reception of another group of signals comprising picture signals and sound signals for two different messages.

With reference to Figure 23 the apparatus and associated circuits 394 for deflecting horizontally and simultaneously the electron ray in each of a number of projecting tubes and for producing sawtooth potentials to control the circuits of Figure 22 comprise a sawtooth generator 460 similar to the genertaor 336 in Figure 19. The sawtooth output of generator 460 may be supplied through the push-pull amplifier 473 to the load resistors 461 through 464 to change the potential on the line or horizontal deflecting plates for the projecting tubes 396, 397, and 398. The horizontal deflecting plates are connected in parallel.

The interval of increasing potential in each line sawtooth wave may comprise one period for video signals and one or more periods for sound signals.

Line and field or frame synchronizing signals received over conductor 459 through switch 465 may be separated in the synchronizing signal separating stage 466. Line and frame control or synchronizing signals may be applied to the trigger tube in the generator 460, to cause backward deflection of the electron rays in the projecting tubes and also to condition the circuits of Figure 22 for the reception of video signals and sound signals for two different messages in successive rotation.

Voltage changes in the load resistor 461 may be supplied over conductors 428 and 429 to control the circuits of Figure 22 as previously explained.

Video signals supplied over conductors 433, 434, and 435 from the circuits of Figure 22 may be applied to the control grids in projecting tubes 396, 397, and 398 for simultaneous scanning.

The apparatus and associated circuits 395 for deflecting vertically and simultaneously the electron ray in each of a number of picture projecting tubes comprise a sawtooth generator 460' similar to the generator 460 and 336. The sawtooth output of generator 460' may be supplied through the push-pull amplifier 474 to the load resistors 467 through 470 to change the potential on the field or vertical deflecting plates for the projecting tubes 396, 397, and 398. The vertical deflecting plates are connected in parallel. Frame control or synchronizing signals from the signal separating stage 466 may be applied to the trigger tube in the generator 460' to cause the backward deflection of the electron rays in the projecting tubes.

In order to control the receiver, Figure 20, from the present standard synchronizing signals as illustrated in Figure 14, rather than the synchronizing signals as illustrated in Figure 13, the sawtooth generators 460 and 460' may be replaced by blocking oscillators 471 and 472 through operation of the switches 473' and 474'. The synchronizing signals at detector 393 may be supplied over conductor 459 through switch 465 to the signal separating apparatus 475 which comprises suitable circuits to supply line synchronizing signals to the line blocking oscillator 471 and field synchronizing signals to the field blocking oscillator 472 to synchronize the scanning actions at the receiver with the scanning actions at the transmitter.

The transmitter in Figure 4 with the receiver in Figure 20 may be used in a private or satellite station. At the satellite receiver, line and field control signals may be intercepted and supplied to the signal separating stage 466 to synchronize the receiver with a public or community transmitting station. These signals may be supplied from stage 466 over conductors 36′ to the transmitter, Figure 4, at the satellite station to control the scanning actions in the satellite transmitter with the scanning actions in the public station. Should the present standard synchronizing signals from a public station be intercepted at the satellite station and fed to the stage 475 to synchronize the receiver, then the line and field control signals from the stage 475 may be supplied over another pair of conductors 36′′ to the transmitter, Figure 20, to synchronize the scanning actions at both the transmitter and receiver in the satellite station with the public broadcasting station.

From the above description it is seen that a private or satellite transmitter may be synchronized with a public broadcasting station so that local programs may be transmitted from the private transmitter to a community broadcasting station for retransmitting.

Figures 24, 31:
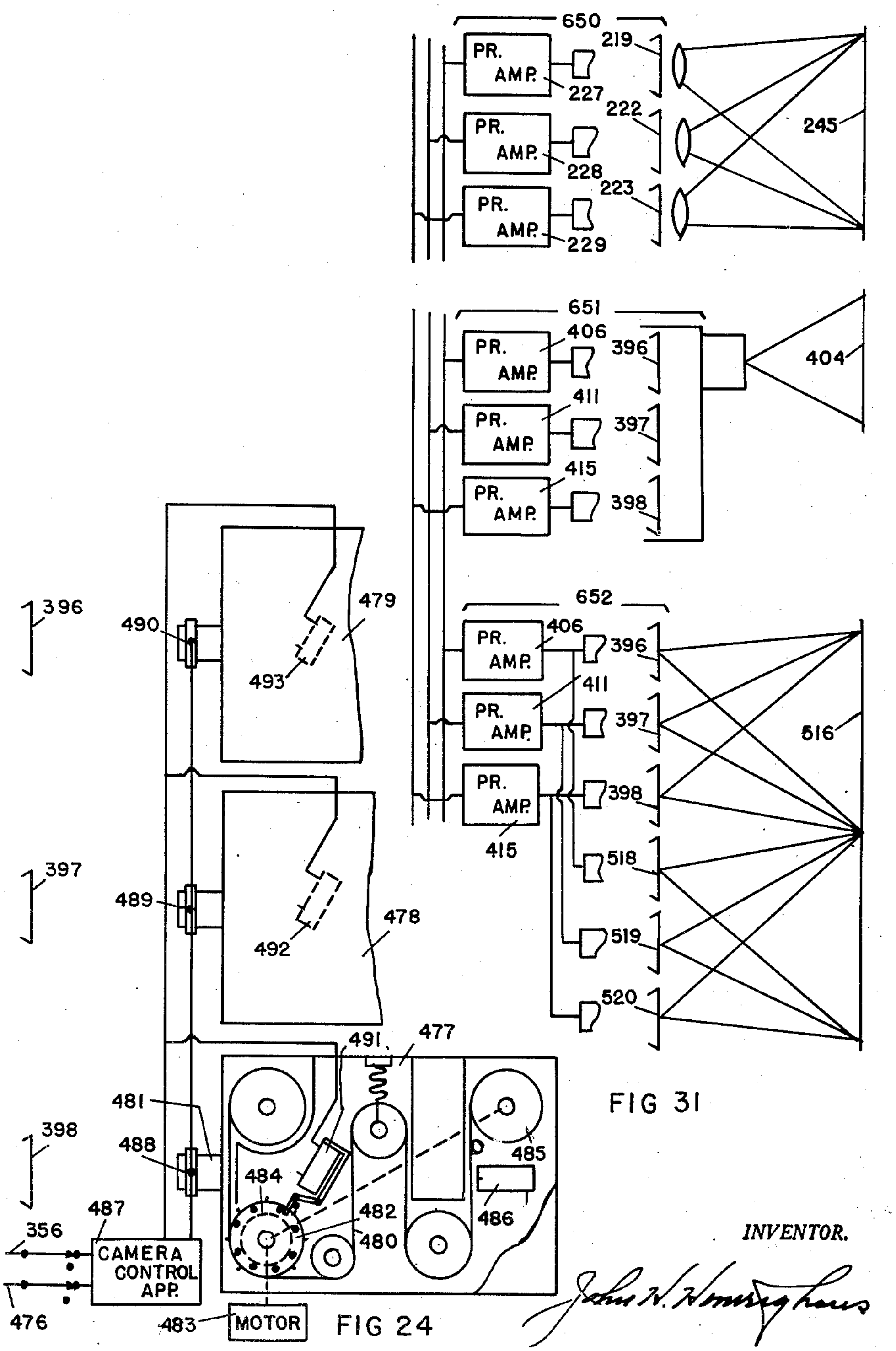
Figure 24 shows a number of motion picture cameras for recording images from several cathode ray tube screens.
Figure 31 shows different sets of projecting tubes for projecting colored television pictures to a number of distant screens.

Figure 24 shows equipment for photographing or recording picture images from a television screen, or from a number of cathode ray tube screens. This equipment comprises three similar moving picture cameras 477, 478, and 479 disposed in front of the three cathode ray tubes 396, 397, and 398 in Figure 20. However, only one camera 477 may be used to photograph the images for line sequential system, which appears on the tube 219, Figure 15.

In the camera 477 the numeral 480 indicates a photographic film adapted to be moved step by step past the lens system 481, by the sprocket wheel 482 driven intermittently by the motor 483 through a slip clutch indicated by the dashed circle 484. The wind up reel 485 may be rotated continuously by the sprocket wheel shaft, as indicated by the dashed line, to move the film at a uniform rate past the glow lamp or light valve 486. The glow lamp 486 may be connected to the amplifier 416 replacing the loud speaker 417 in Figure 20, or the glow lamp 486 may be connected to the amplifier 232 replacing the loud speaker 235 in Figure 15.

Vertical or frame synchronizing signals may be received over conductor 476 or 476′ from the circuits of Figure 23 when three cameras are used for simultaneous recording of the images on three different screens, the images on each screen may be black and white, and representative of different colors in the scene being televised. The synchronizing signals control the camera control apparatus 487 to cause simultaneous operation of the three shutters 488, 489, and 490 and also simultaneous operation of the three sprocket release magnets 491, 492, and 493 to move the associated films for the next exposure. The camera control apparatus 487 may be similar to Figures 10 and 11 described in my application Serial Number 648,993, filed February 20, 1946, and further explanation is thought to be unnecessary.

The cameras 478 and 479 are similar to the camera 477 and are shown in block form only.

Synchronizing signals may be received over conductors 356 or 356′ from the circuits of Figure 19 when one camera is used for recording the images on a single tube screen. The monochrome images on the screen may be in three distinct locations each representative of a different color. These signals control the camera control apparatus 487, previously described, to actuate the camera shutter and sprocket magnet.

Each film after development may be as illustrated in Figure 2 with the conventional picture frames and sound track. The picture images on each film may be different shades of black, representative of a different color. Three films may be glued together forming three picture tracks and three sound tracks as illustrated in Figure 25.

Figure 26:
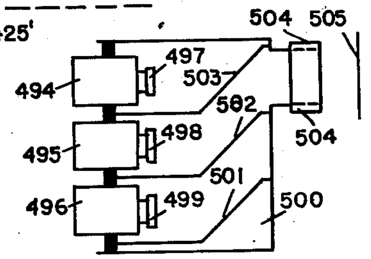
Figures 26 and 27 show lens and mirror devices for motion picture projectors and cameras.

In Figure 26 I have shown three moving picture machines 494, 495, and 496 of conventional type, having color filters 497, 498, and 499, mounted in a compartment 500 similar to the compartment 421, Figures 20 and 21, for simultaneously projecting images from three films produced by the equipment of Figure 24. Mounted in the compartment 500 are the opaque mirror 501 and two partially silvered mirrors 502 and 503 to direct light rays from the moving picture machines through a common path or projecting lens system 504 to a distant screen 505 to form thereon complete color pictures.

From the above description it is seen that I have provided a novel method for producing three monochrome picture films from televised pictures and for projecting images from each of the films to a distant screen to form thereon complete color pictures.

In Figure 27 I have shown three moving picture cameras 505, 506, and 507, of conventional type or similar to those shown in Figure 24, mounted in a compartment 508, similar to the compartment 5, Figure 1, for simultaneously recording different images of the same scene on three moving picture films, the images on each film representative of a different color in the scene being photographed. Mounted in the compartment 508 are the color filters 509, 510, and 511, the opaque mirror 512, and two partially silvered mirrors 513 and 514 to direct light rays passing through the lens system at 515 through the color filters to the three cameras, whereby three monochrome films are produced, each representative of a different color.

Figure 28 illustrates a system for projecting partial images of different colors to a number of different locations on a large screen 516 to form thereon complete color pictures from the partial images appearing on a number of cathode ray image projecting tubes. The projecting tubes 396, 397, and 398, also shown in Figure 20, may have different colored phosphor screens arranged to project partial images of the same portion of the scene being televised to section 517 on the screen 516. The projecting tubes 518, 519, and 520 may have similar colored phosphor screens arranged to project partial images of another portion of the scene being televised to section 521 on the screen 516. Likewise the projecting cathode ray tubes 522, 523, and 524, and similar tubes 525, 526, and 527, may have similar colored phosphor screens arranged to project other partial images of other portions of the scene to sections 528 and 529 on the distant screen 516.

While I have shown only four sections on the distant screen, there may be a larger number of cathode ray projecting tubes similar to those described above to project smaller portions of the scene being televised to a greater number of screen sections, so that a much larger distant screen may be employed. The number of lines per frame where the pictures are projected to a large screen is preferably one thousand or more.

Figure 29:
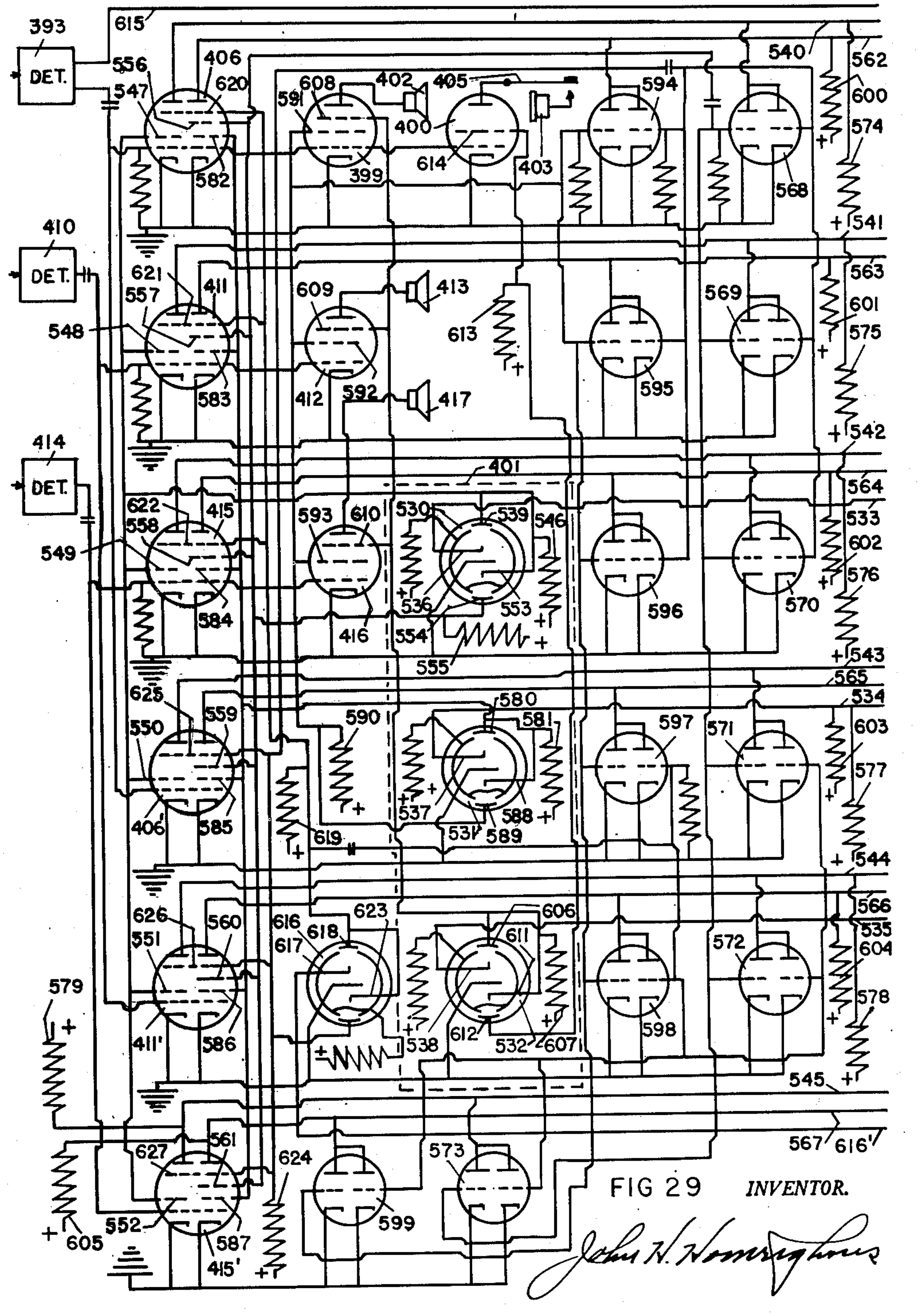
Figure 30:
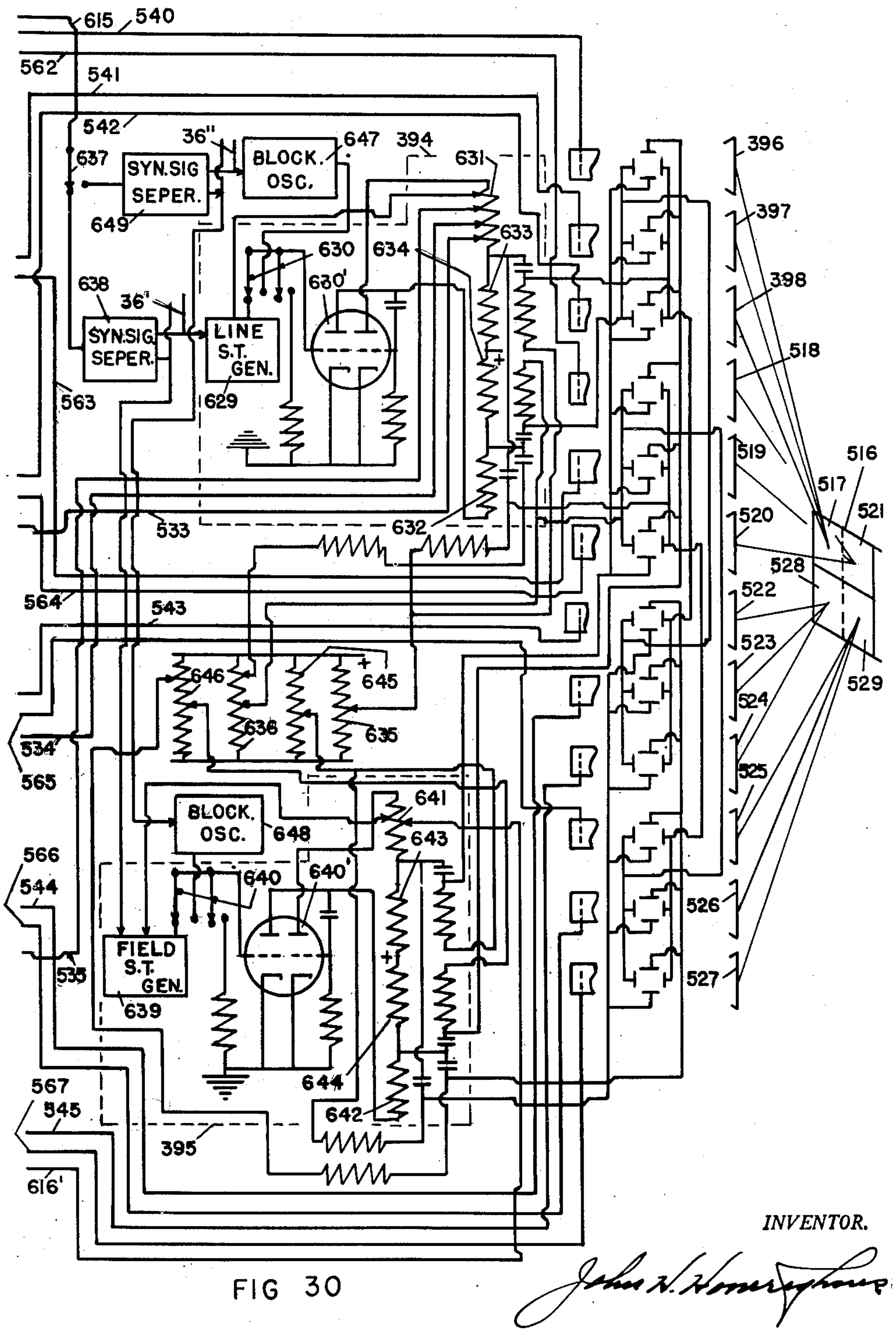

Figures 29 and 30 show the apparatus and associated circuits for selecting suitable periods of time for different portions of received video signals to project partial images to different sections of a large screen as shown in Figure 28. These circuits may also cause the selection of suitable periods of time for fragmentary portions of different groups of received sound signals to produce stereophonic sound effects.

In Figures 29 and 30 certain of the components, such as the second detectors, one group of video amplifiers, and associated sound signal amplifiers have been assigned reference numerals shown in Figure 20. A second group of video amplifiers have similar reference numerals primed. Likewise three of the cathode ray projecting tubes have reference numerals shown in Figure 20. For clearness the other projecting tubes have been assigned different reference numerals.

Figure 29 shows message distributor and associated circuits or periods of time selecting equipment which may replace the equipment in Figure 22 for the receiving station shown in Figure 20 to project television pictures to large distant screens with stereophonic sound. The message distributor 401 for allotting suitable periods of time in the interval of a line sawtooth wave for separating received video signals into two groups and sound signals into two groups comprises three off and on relay tubes 530, 531, and 532 for controlling the power amplifiers 399, 400, 406; 411 and 412; 415 and 416; 406'; 411' and 415'. The control grids in amplifiers 399, 400, 406, and 406' are connected together, the control grids in amplifiers 411, 412 and 411' are connected in parallel, and the control grids in power amplifiers 415, 416, and 415' are in parallel. The tubes 530, 531, and 532 are controlled by sawtooth potentials produced in the line deflecting apparatus and associated circuits of Figure 30 applied over conductors 533, 534, and 535 to the control electrodes 536, 537, and 538. The sawtooth potentials applied to the control electrodes 536, 537, and 538 may be adjusted in the circuits of Figure 30 for different operating conditions. As the sawtooth potential produced in the circuits of Figure 30 increases, the potential supplied to the control electrode 536 will also increase causing the electrons to flow to the anode 539 at the time the electron rays in the tubes 396, 397, and 398, or 522, 523, and 524, reach the leaving edges of their associated screens, corresponding horizontally to the middle of the large screen 516, Figure 30. Thus received picture signals from the detectors 393, 410, and 414 supplied to the control grids in the first unit of the power amplifiers 406, 411, and 415, or 406', 411', and 415' may be amplified in these power stages and fed over conductors 540, 541, 542, or 543, 544, and 545 to the control grids in the projecting tubes 396, 397, and 398 or 522, 523, and 524, Figure 30, during the line trace periods of the electron rays in these projecting tubes.

As soon as current flows through the anode 539 and the load resistor 546, a voltage drop at resistor 546 is impressed on the grids 547 through 552 to render the first unit of the power stages 406, 411, and 415 or 406', 411', and 415' inoperative to any further increases in the sawtooth potential. The potential drop at resistor 546 is also applied to the control electrode 553 to block or rotate the electrons from the anode 554, thereby increasing the potential at load resistor 555 and to the grids 556 through 561 in the second unit of the video power amplifiers 406, 411, and 415 and 406', 411', and 415'. Thus this permits video signals from the detectors 393, 410, and 414 supplied to the control grids in the second unit of the video power amplifiers to be fed over conductors 562, 563, and 564 or 565, 566, and 567 to the control grids in the projecting tubes 518, 519, and 520 or 525, 526, and 527, Figure 30, during the line trace period of the electron rays in these projecting tubes occurring immediately after the trace periods in projecting tubes 396 and 522. The increase in potential at resistor 555 is also supplied to the control grids in the first unit of tubes 568 through 573 to cause a voltage drop at the resistors 574 through 579 which may be applied over conductors 540 through 545 to blank the electron rays in projecting tubes 396, 397, 398, 522, 523, and 524 during trace periods in the projecting tubes 518, 519, 520, 525, 526, and 527, and other periods for sound signal and synchronizing signal reception. After the trace period in tubes 518 and 525 the sawtooth voltage on control electrode 537 will have increased to permit current to flow through the anode 580 and load resistor 581 to produce a potential drop at resistor 581 and the grids 582 through 587, thus blocking the second unit of tubes 406, 411 415, 406', 411', and 415' to any signals on their control grids during further increases in the sawtooth potential.

The drop in potential at resistor 581 is also applied to the control electrode 588 blocking current flow through the anode 589 and load resistor 590, thereby increasing the potential at the grids 591, 592, and 593 in the power amplifiers 399, 412, and 416, thus permitting sound signals received from the detectors 393, 410, and 414 and applied to the control grids of the power amplifiers 399, 412, and 416 to be fed to the loud-speakers 402, 413, and 417 immediately after reproduction of picture images. The increase potential at resistor 590 is also supplied to the control grids in the first unit of tubes 594 through 599 to cause a voltage drop at the resistors 600 through 605, which may be applied over conductors 562 through 567 to blank the electron rays in the projecting tubes 518, 519, 520, 525, 526, and 527 during sound signal and synchronizing signal reception. After reception of sound signals related to the pictures, the sawtooth potential on the control electrode 538 will have increased to permit current to flow through the anode 606 and the load resistor 607 to produce a potential drop at resistor 607 and the grids 608, 609, and 610, which action blocks the power amplifiers to any further sound signals on their control grids during further increases in the sawtooth potential.

The drop in potential at resistor 607 is also applied to the control electode 611, blocking current flow through the anode 612 and load resistor 613, thereby causing grid 614 in the power stage 400 to become more positive. Positive potential on grid 614 permits other sound signals, representative of reports, from the detector 393 supplied to the control grid of the power amplifier 400 to be fed to the reproducer 403.

After a short period of time for reception of sound signals through the amplifier 400 control or synchronizing signals from the detector 393 are fed over conductor 615 to the circuits of Figure 30 to control or trigger the sawtooth voltages and restore the line circuits of Figure 29 to start reception of another group of signals comprising video signals and sound signals representative of different messages.

From the above description it is shown that the line interval for receiving video signals is separated into two trace periods, the first trace periods in a number of lines for reproducing the left portion of the televised scenes, and the second trace periods for reproducing the right portion of the televised scenes. While I have shown only two trace periods in each horizontal line, the interval for vodeo signals in each line may be further divided to increase the width of the reproduced pictures.

In order to reproduce pictures on a large screen of proper proportions the field or frame interval may be divided into two or more periods so that different projecting tubes may be utilized for different portions of the received video signals. Power amplifiers 406, 411, and 415 may control the projecting tubes for the upper portions of the televised scene and power amplifiers 406', 411', and 415' may control the projecting tubes for the lower portions of the televised scene. Therefore, I provide a relay tube 616 under control of vertical sawtooth voltages produced in the frame deflecting apparatus and associated circuits of Figure 30 and applied over conductor 616' to the control electrode 617. The sawtooth voltages applied to the control electrode 617 may be adjustable in the circuits of Figure 30 for different operating conditions.

At the same time as the sawtooth potential applied to the control electrode 617 increases to cause current flow through the anode 618 to produce a voltage drop at load resistor 619, the electron rays in the projecting tubes 396, 397, 398, 518, 519, and 520, Figure 30, reach the bottom of their associated screens, corresponding to the middle vertically of the large screen 516, Figure 30. The voltage drop at resistor 619 may be applied to the grids 620, 621, and 622 in power amplifiers 406, 411, and 415 rendering these amplifiers non-conductive to video signals during the time that picture images are being projected to the lower half of the large screen 516. The voltage drop at resistor 619 may be applied to the control grids in the second unit of amplifiers 571, 572, 573, 597, 598, and 599 to render the second unit of these amplifiers nonconductive in order that video signals may be applied over conductors 543, 544, 545, 565, 566, and 567. The voltage drop at resistor 619 may also be applied to the control electrode 623 to block current flow through the load resistor 624. The increase in potential at resistor 624 may be applied to the grids 625, 626, and 627 in the power amplifiers 406', 411', and 415' to render these tubes conductive to video signals immediately following the vertical deflection in projecting tube 396 and others. The increase in potential at load resistor 624 may also be applied to the control grids in the second unit of the amplifiers 568, 569, 570, 594, 595, and 596 to render these tubes conductive, thereby blanking the projecting tubes for the upper portions of the televised pictures while images are being produced on the projecting tubes for the lower portions of the televised pictures.

After full vertical deflection of the electron rays in the tubes for the lower portion of the televised scenes, control or vertical synchronizing signals may be fed over conductor 615 to the circuits of Figure 30 to control or trigger the vertical sawtooth voltages and restore the frame circuits of Figure 29 to start another field or frame.

With reference to Figure 30 the apparatus and associated circuits 394 for deflecting horizontally and simultaneously the electron ray in each of a number of projecting tubes and for producing line sawtooh potentials to control the circuits of Figure 29 comprise a sawtooth generator 629 similar to the generator 336 in Figure 19. The sawtooth output of generator 629 may be supplied through the switch 630 to the amplifier 630' and the output of amplifier 630' may be fed to the load resistors 631 through 634 to cause horizontal deflection of the electron rays in all of the projecting tubes. The right horizontal deflecting plates for the projecting tubes 396, 397, 398, 518, 519, 520, and 522 through 527, shown to the right in the drawings may be connected to high potential at centering resistor 635. The left horizontal deflecting plates for projecting tubes 396, 397, and 398 and similar tubes 522, 523, and 524 may be connected to a lower valve of high potential at centering resistor 636 than the left horizontal deflecting plates for the projecting tubes 518, 519, and 520 and like tubes 525, 526, and 527, so that the electron rays in the projecting tubes 396, 397, and 398 may be deflected horizontally in unison across their associated screens and thereafter the electron rays in the projecting tubes 518, 519, and 520 may be deflected horizontally in unison across their associated screens. This is followed, after a number of lines have been scanned, by the horizontal deflection of the electron rays in tubes 522, 523, and 524 in unison across their associated screens and thereafter the electron rays in projecting tubes 525, 526, and 527 may be deflected in unison across their associated screens.

The interval of increasing potential in each line sawtooth wave may comprise two periods for video signals and two periods for sound signals.

While I have shown three projecting tubes for each screen section 517, 521, 528, and 529 on the distant screen 516, it is to be understood that only one projecting tube per screen section, such as 396, 518, 522, and 525, may be utilized for monochrome pictures.

Line, field and frame synchronizing signals received over conductor 615 through switch 637 may be separated in the signal separating stage 638. Line and frame control or synchronizing signals may be applied to the trigger tube in the generator 629 to cause backward deflection of the electron rays in the projecting tubes and also to condition the circuits of Figure 29 for reception of another series of video and sound signals.

Voltage changes in the load resistor 631 may be supplied over conductors 533, 534, and 535 to control the circuits of Figure 29 as previously explained.

Video signals supplied over conductors 540 through 545 and 562 through 567 from the circuits of Figure 29 may be applied to the control grids in projecting tubes 396, 397, and the others.

The apparatus and associated circuits 395 for deflecting the electron ray vertically and simultaneously in each of a number of picture projecting tubes comprise a sawtooth generator 639 similar to the generators 629 and 336. The sawtooth output of generator 639 may be supplied through switch 640 to the amplifier 640'. The output of amplifier 640' may be fed to the load resistors 641 through 644 to change vertical deflection of the electron rays in all of the projecting tubes. The bottom vertical deflecting plates for the projecting tubes 396, 397, 398, 518, 519, 520, and 522 through 527 may be connected to high potential at centering resistor 645. The top vertical deflecting plates for the projecting tubes 396, 397, 398, 518, 519, and 520 may be connected to a lower value of high potential at centering resistor 646 than the top vertical deflecting plates for the projecting tubes 522 through 527, so that the electron rays in the projecting tubes 396, 397, 398, 518, 519, and 520 may be deflected vertically in unison over their associated screens to be followed by the vertical deflection of the electron rays in tubes 522 through 527 in unison across their associated screens.

The interval of increasing potential in each vertical sawtooth wave may comprise two periods for video signals, one period for images projected to the upper half of screen 516 and a second period for images projected to the lower half of screen 516.

Frame control or synchronizing signals from stage 638 may be applied to the trigger tube in the generator 639 to cause the backward deflection of the electron rays in the projecting tubes.

In order to control the circuits of Figures 29 and 30 from the present standard synchronizing signals as illustrated in Figure 14, rather than from the synchronizing signals as illustrated in Figure 13, the sawtooth generators 629 and 639 may be replaced by blocking oscillators 647 and 648 through operation of the switches 630 and 640. The synchronizing signals at detector 393 may be supplied over conductor 615 through switch 637 to the signal separating apparatus 649 which comprises suitable circuits to supply line synchronizing signals to the line oscillator 647 and field synchronizing signals to the field oscillator 648 to synchronize the scanning actions at the receiver with the scanning actions at the transmitter.

The circuits of Figures 29 and 30 in the receiver shown in Figure 20 may be used in a private or satellite television system, with a transmitter shown in Figure 4 transmitting over a carrier wave outside the band of frequencies for public broadcasting stations. At the satellite receiver, line and field control signals may be intercepted and supplied to the signal separating stage 638, shown in Figure 30, to synchronize the receiver with a public transmitting station. These control signals may be supplied from the stage 638 over conductors 36′ to the transmitter, Figure 4, at the satellite station to synchronize the scanning actions in the satellite transmitter with the scanning actions in the transmitter for the public broadcasting station. Should the present standard synchronizing signals be intercepted at the satellite station and fed to the stage 649 to synchronize the receiver, then the line and field control signals from stage 649 may be supplied over another pair of conductors 36″ to the transmitter, Figure 20, so that the satellite station may be under the control of synchronizing signals produced in the public station in order that local scenes televised on the satellite station screens may be retransmitted at the public station.

While I have shown a number of equipments for the transmission and reception of three sound signal messages in Figures 4, 20, and their associated message distributors for stereophonic sound effects, it is to be understood that only equipment for one sound message may be utilized and the other two equipments eliminated.

Figure 31 shows an arrangement of different sets of cathode ray projecting tubes for projecting to a number of distant screens like images of a scene being televised. The power amplifiers and projecting tubes shown at 650 are numbered to correspond to those shown in Figures 15 and 19, for field sequential scanning or line sequential scanning may be utilized as previously explained to project different images representative of different colors to the distant screen 245. While only one set of equipment 650 for projecting picture images to a distant screen 245 is shown, other similar equipments may be utilized to project like images to other distant screens 404 and 516 in the same theater.

The power amplifiers and projecting tubes shown at 651 are numbered to correspond to those shown in Figures 20 and 23, for simultaneous scanning, to project different images each representative of a different color to a distant screen 404.

The power amplifiers and projecting tubes shown at 652 are numbered to correspond to those shown in Figure 30, for simultaneous scanning, each set of three tubes to project different partial images each representative of a different color to different sections of the distant screen 516. The screens 404 and 516 may be in the same theater so that more people may view the same pictures in larger theaters. All of the screens may show the same pictures from similar equipments, or the screen 245 may be located at an angle to the other screens so that different pictures may be produced in 650 and shown on the screen 245 in orded that patrons may view either one or both pictures Loud speakers may be arranged at the different screens 404 and 516 as illustrated in Figure 20.

Figure 32:
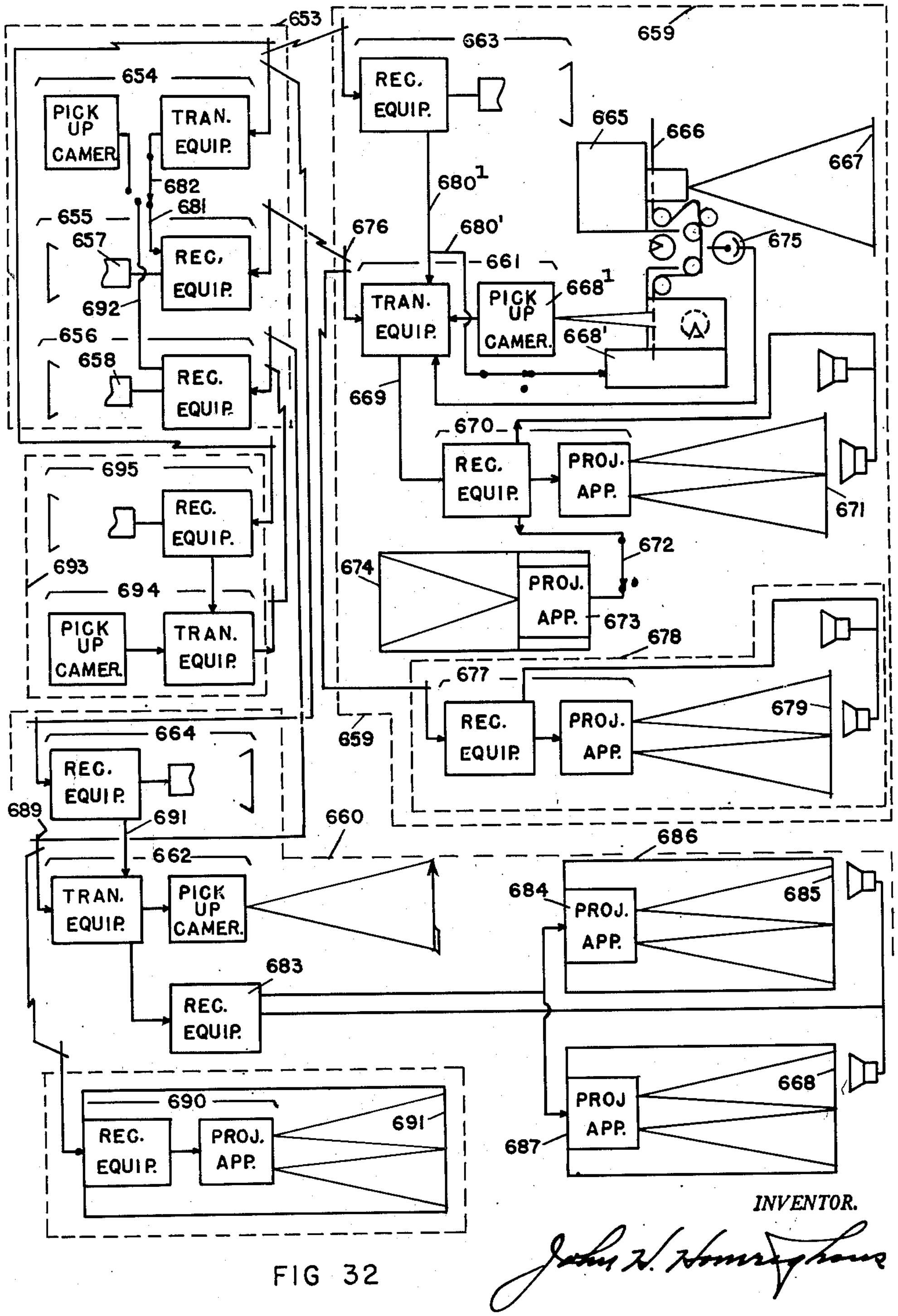
Figure 32 is a block diagram of a number of private television systems for multi-screen reproductions and for transmitting pictures to community broadcasting stations, under control of the community station, for retransmission.

With reference to Figure 32 I have shown a number of private television systems for multiscreen reproductions with means to transmit video signals representative of local scenes to a main or public broadcasting station, under control of synchronizing signals from the public station.

The public broadcasting system shown at 653 comprises a transmitting station and two or more receiving stations. The transmitting station may be similar to the transmitting station shown in Figure 4 with simultaneous scanning for color pictures and stereophonic sound effects. However, the transmitter may be similar to Figure 1 with either line or field sequential scanning and only one sound message. The receivers 655 and 656 may be similar to the receiver shown in Figure 20 with simultaneous scanning for color pictures and stereophonic sound reproduction. However, the receivers 655 and 656 may be similar to the receiver shown in Figure 15 with either line or field sequential scanning and only one sound message, depending, of course, on the type of system used in the community. The projecting apparatus 657 and 658 may be used for monitoring programs.

The private television system 659 for theaters and the system 660 for department stores or other commercial establishments may have transmitting stations 661 and 662 similar to the transmitting station 654 and the receiving stations 663 and 664 may be similar to the receiving stations 655 and 656.

In the private television system 659 for theaters I have shown a motion picture machine 665 for projecting picture images from the film 666 to a large screen 667. The pick up camera 668 having a cathode ray tube similar to that cathode ray tube shown in Figure 4 may produce video signals representative of the images on the film 666. The motion picture machine 665 may be located in a distribution center, instead of a theater, for televising the motion pictures to a number of theaters. The video signals may be transmitted over wire connections 669 to the receiving station 670, similar to the receiving station 663, where the signals may be utilized to produce colored or monochrome pictures on the large screen 671 in the same theater or in another nearby theater. These signals may also be supplied through switch 672 to the projecting equipment 673 for showing short runs of the pictures in the theater on the screen 674 outside the theater for advertising purposes. The projecting apparatus 673 and other similar apparatus may comprise one or more cathode ray projecting tubes similar to those in Figures 15 and 20. Sound signals produced from the sound track on film 666 through the photo cell 675 may be applied over the wire connections 669 to the receiver 670 for actuating the loud speakers near the screen as previously explained.

Since the motion picture machine 665 may be projecting pictures at the rate of twenty-four frames per second the television transmitting stations 661 and 670 the receiving station may also be adjusted to scan twenty-four image frames per second. However, in the preferred form the transmitting station 661 and receiving station 670 may scan alternate picture frames on the film 666 three times and intermediate frames twice. This may be accomplished by the film control mechanism 668′ to be more fully explained later.

The video and sound signals may be transmitted from the antenna 676 on a carrier wave outside the band of public broadcast frequencies. The carrier waves may be intercepted by the receiver 677 in the satellite station 678 where the reproduced images may be projected to the screen 679 with the sound signals actuating the loud speakers.

It may be desirable for advertising and entertaining purposes to transmit from a public broadcasting station, such as station 654, certain portions of the film showing in the theaters. Under these conditions the receiving station 663 may be tuned to receive the carrier waves transmitted from the public station 654 to demodulate and supply the received synchronizing signals over conductors 680 to the transmitting station 661 to synchronize the transmitter 661 with the public transmitting station 654, as previously explained, whereby video and sound signals are received at the receiving station 655 over a carrier wave of a frequency different than the frequency of the broadcasting station 654. From the receiver 655 the video and sound signals may be fed over conductor 681 through the switch 682 to the transmitting station 654 for retransmitting on a public broadcast channel.

In the private television system 660 for department stores and other commercial houses the transmitting station 662 may develop video signals representative of local scenes or exhibits. These video signals together with sound signals may be supplied to the receiving station equipment 683 and projecting equipment 684, similar to receiving station 670, where the reproduced images may be projected to the screen 685. The projecting apparatus 684 may be disposed to the rear of screen 685 and in an enclosure 686 so that the screen may be located in a display window. The projecting apparatus 687 connected to the receiver equipment 683 may project the same picture images to screen 688 located in another display window. Sound signals to go with the pictures may be supplied to the receiver equipment 683 for actuating the loud speakers near the screens.

The video and sound signals may be transmitted from the antenna 689 on a carrier wave of a different frequency than used for public broadcasting. The carrier wave may be intercepted by the billboard receiver station 690 where the reproduced images may be projected to the screen 691. The billboard structure may enclose the receiving station 690 and may be located in any suitable place for advertising purposes, such as the top of a building or in rural areas near a heavy traffic highway.

From an advertising standpoint it may be desirable to transmit pictures of an exhibit or other store scenes from a public broadcasting station, such as station 654. Under these conditions the receiving station 664 may be tuned to receive the carrier waves transmitted from the public station 654 to demodulate and supply the received synchronizing signals over the conductors 691 to the transmitting station 662. The transmitter 662 is synchronized with the public transmitting station 654 whereby video and sound signals are received at the receiving station 656 over a carrier wave different than the frequency of the broadcasting station 654. From the receiver 656 the video and sound signals may be fed over conductor 692 through the switch 682 to the transmitting station 654 for retransmitting on a public carrier wave channel.

The mobile television system 693 comprises a transmitting station 694, similar to the transmitter 654, which may be under control of synchronizing signals received at the receiver station 695 from the main station 654, to transmit video signals representative of scenes televised by the mobile station and also to transmit related sound signals for retransmitting over a public broadcasting channel at station 654.

One of the main advantages of the television systems last described is that the mobile and the satellite stations may be controlled or synchronized by signals from a main or public channel station.

Figure 33:
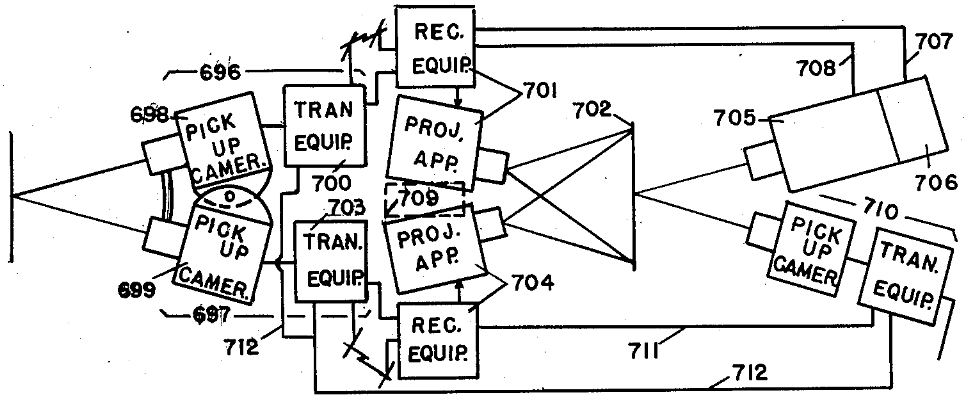
Figure 33 is a block diagram showing a television system for producing stereoscopic images in color with means for recording the images on a film.

With reference to Figure 33 the transmitting stations 696 and 697, similar to Figure 1 or 4, comprise the pick up cameras 698 and 699 adapted to be focused on the same image by well known parallox correction methods. The lenses may be mechanically coupled so that the adjustment of the lens for one camera automatically adjusts the lens for the other camera. Video signals produced in the camera 698 and related sound signals may be supplied to the transmitter equipment 700 for wireless transmission or the signals may be fed over wire connections to the receiving station 701, similar to Figure 15 or 20, where the reproduced images in color may be projected to the screen 702. Video signals produced in the camera 699 may be supplied to the transmitting equipment 703 for wireless transmission or the signals may be fed over wire connections to the receiving station 704, similar to 701, where the reproduced images in color may be projected to the same area on screen 702 as the images from station 701 in order to produce images in color on the screen appearing to have depth.

The screen 702 may be transparent so that the images on the screen may be photographed on a moving film in the moving picture camera 705, which may be similar to the camera 477 shown in Figure 24. The film may have a coating for recording the different colors from the screen 702. The film and shutter control apparatus 706 may be controlled by field synchronizing signals fed over conductor 707. Sound signals supplied over conductors 708 may be recorded in one or more sound tracks on the film as described in connection with Figure 24. The camera 705 may be located on the opposite side of the screen between the two projecting apparatuses as indicated by the dotted block 709.

The transmitting station 710 similar to Figure 1 or 4 may be a public channel station for televising the stereoscopic images appearing on the screen 702. Sound signals supplied over conductors 711 may be transmitted from station 710. Synchronizing signals from station 710 may be fed over conductors 712 to the transmitters 696 and 697 so that all three transmitting stations are synchronized. The pick up camera in station 710 may be located on the opposite side of the screen as indicated by the block 709.

The screen 702 and the receiving stations 701 and 704 may be used to show in theaters colored pictures with the appearance of depth. But one of the main advantages of the system is to provide means for producing a moving picture film in the camera 705 with individual images in the different colors of the scene to give the appearance of depth when projected to a screen.

Figure 34:
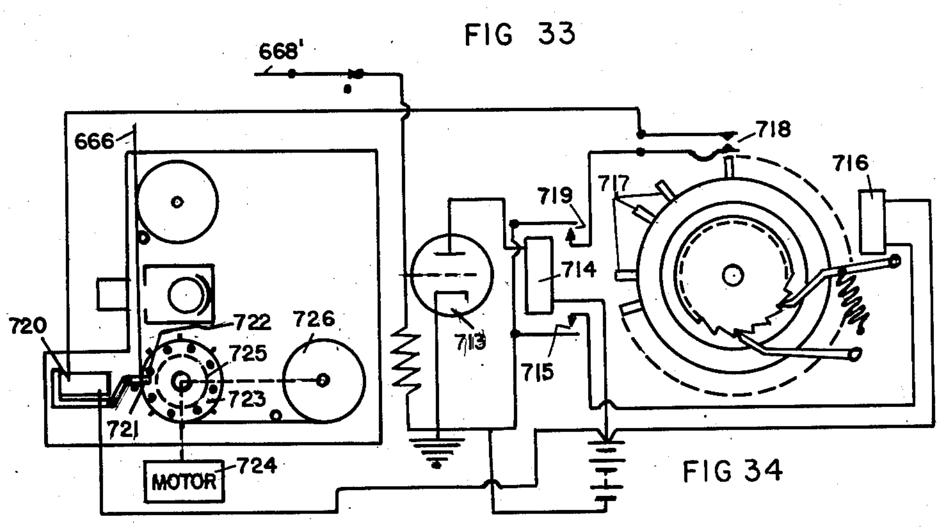
Figure 34 shows mechanism for actuating a motion picture film for the camera tube.

Figure 34 shows a mechanism for moving a motion picture film step by step in front of a television camera for scanning thirty frames or sixty fields from twenty-four picture images on the film. This mechanism is very similar to that shown in my prior application Serial Number 648,993. Field or vertical control signals from conductor 680′, Figure 32, may be applied to the grid in tube 713, thereby actuating impulse relay 714. Relay 714 upon energizing closes a circuit at contacts 715 for stepping magnet 716. The release of the stepping magnet 716 rotates the cams 717 one step. The spring contacts 718 may be closed on each two and three vertical control impulses in sequence or on the second, fifth, seventh, etc., impulses so that relay 714 upon energizing on the third, sixth, eighth, etc., impulses closes a circuit at contacts 719 for the release magnet 720. The momentary energization of magnet 720 draws the holding bar 721 out of engagement with the pin 722, thus releasing the sprocket pulley 723 to pull the film 666 down the distance of one frame. The sprocket pulley may be driven by the motor 724 through a friction clutch indicated by the dotted circle 725. The wind-up reel 726 may be driven by the motor 724.

Figure 35:
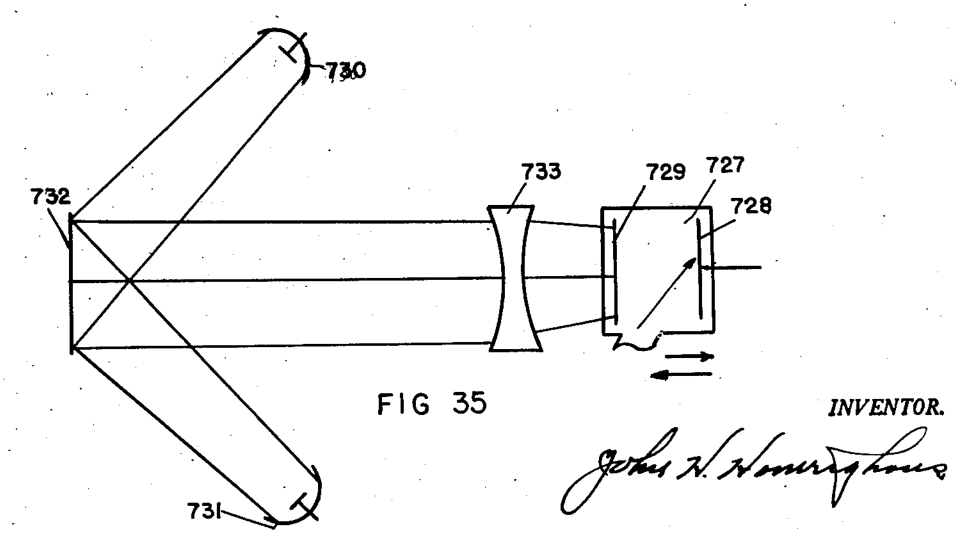
Figure 35 shows a modification for the pick-up camera shown in Figure 1.

With reference to Figure 35 the cathode ray camera tube 727 may be similar to the tube 1 in Figure 1 except that only one mosaic screen 728 is provided and a transparent screen 729 coated with fluorescent material, sensitive to radio waves to cause it to glow, is disposed in front of the mosaic screen so that short radio waves from the antennas 730 and 731 reflected from the object scene 732 may be directed or focused by the metal lens 733 onto the fluorescent screen 729. The screen glows in accordance with received radio waves reflected from the object 732. The light image or glow from the screen 729 may be projected to the mosaic 728 which is scanned by an electron ray in a well known manner to produce video signals. The video signals may be fed to the amplifier 13, Figure 1, to modulate a carrier wave, as previously explained. The object scene 732 may be an airplane landing field so that carrier waves reflected from the field may produce an image of the field on a television screen in the airplane as an aid for blind landing.

In the various circuits shown and described I have simplified the drawings by indicating the source of potential by a sign. Also I have omitted the heater filaments, for the various tubes, but it will be understood that such filaments are necessary.

The embodiments of the invention which have been given herein are illustrations of ways the various features may be accomplished and of the principles involved. It is to be understood that the invention contained herein is capable of embodiment in many other forms and adaptations, without departing from the spirit of the invention and the scope of the appended claims.

Having thus described my invention, I claim:

1. In a color television system, means including a first cathode ray device with a first adjustable member to concurrently produce a first, second and third image of a scene within the view of the device, each of the said images representative of a different color in said scene, means including a second cathode ray device with a second adjustable member controlled by said first member to concurrently produce a fourth, fifth and sixth image of said scene representative respectively of the same areas and the same colors as said first, second and third images, and means associated with said devices including a first saw tooth generator and a second saw tooth generator to scan the said images in said first device concurrently with the said images in said second device to produce two groups of picture signals each representative of different color components of said scene.

2. In a television system, a main station, generator means at said station to produce line synchronizing signals and frame synchronizing signals with the line synchronizing signal frequency higher than the frame synchronizing signal frequency, first signal transmitting means including an antenna at said main station to transmit said synchronizing signals, a satellite station, means at said satellite station to receive said synchronizing signals, means at said satellite station including a cathode ray device having a screen and an electron ray under control of said received synchronizing signals to produce picture signals reperesentative of a scene within the view of said device, second signal transmitting means at said satellite station to transmit said picture signals, and means at said main station to receive said picture signals, said first transmitting means electrically connected to said last means to retransmit said received picture signals from said antenna along with the said synchronizing signals transmitted from said antenna.

3. In a television system, a main station, generator means at said station to produce a first set and a second set of synchronizing signals with the first set of signals having a higher frequency than the second set of signals, means at said station to produce a first carrier wave, first signal transmitting means at said main station to transmit said synchronizing signals modulated on said first carrier wave, a satellite station, means at said satellite station to receive said synchronizing signals, means at said satellite station including a cathode ray device having a screen and an electron ray under control of said received synchronizing signals to produce picture signals representative of a scene within the view of said device, means at said satellite station to produce a second carrier wave, second signal transmitting means at said satellite station to transmit said picture signals modulated on said second carrier wave, and means at said main station to receive said picture signals, said first transmitting means electrically connected to said last means to retransmit said received picture signals modulated on said first carrier wave along with the said synchronizing signals modulated on said first carrier wave.

4. In a television system, a main station, generator means at said station to produce line synchronizing signals and frame synchronizing signals with the line synchronizing signal frequency higher than the frame synchronizing signal frequency, first signal transmitting means at said main station to transmit said synchronizing signals, a satellite station, means at said satellite station to receive said synchronizing signals, means at said satellite station including time constant circuits under control of said received synchronizing signals to produce line and frame saw tooth waves, means at said satellite station including a cathode ray device having a screen and an electron ray under control of said saw tooth waves for multi-line per frame scanning of the screen to produce picture signals representative of a scene within the view of said device, means at said satellite station to produce electrical signals representative of sound, second signal transmitting means at said satellite station under control of said line saw tooth waves to transmit said picture signals and fragmentary portions of said electrical signals, and means at said main station to receive said picture signals and fragmentary portions of said electrical signals, said first transmitting means electrically coupled to said last means to retransmit said received picture signals and electrical signals along with the said synchronizing signals transmitted from said main station.

5. The method of retransmitting picture signals which comprises the steps of producing synchronizing signals at a first station, producing a first carrier wave, transmitting the synchronizing signals modulated on said carrier wave, receiving the synchronizing signals at a second station, producing picture signals representative of a scene, at the second station, under control of the received synchronizing signals, producing a second carrier wave, transmitting the picture modulated on said second carrier wave signals, receiving the picture signals at the first station, and retransmitting the picture signals modulated on said first wave along with the synchronizing signals produced at the first station.

6. In a television system, a main station, generator means at said station to produce line synchronizing signals and frame synchronizing signals with the line synchronizing signal frequency higher than the frame synchronizing signal frequency, first signal transmitting means at said main station to transmit said signals, a satellite station, means at said satellite station to receive said synchronizing signals, cathode ray tube means at said satellite station under control of said received synchronizing signals for multi-line per frame scanning action to produce picture signals representative of a scene within the view of said tube, means at said satellite station to produce at least two groups of electrical signals representative of sound from different locations near said scene, second signal transmitting means at said satellite station under control of said received synchronizing signals to transmit said picture signals and fragmentary portions of both of said groups of electrical signals, and means at said main station to receive said picture signals and said fragmentary portions of the electrical signals, said first transmitting means electrically coupled to said last means to retransmit said received picture signals and electrical signals along with the said synchronizing signals transmitted from said main station.

7. In a television system, a motion picture film, means including a cathode ray device to produce picture signals representative of the images on said film, said means also comprising an electrical timing mechanism for controlling an electrical circuit at irregular intervals to move successive portions of said film within the view of said device for a relatively short interval and for a relatively long interval in rotation.

8. In a television system, a motion picture film, means including a cathode ray device to produce picture signals from the images on said film, said means also comprising an electrical timing mechanism for controlling an electrical circuit at irregular intervals to move successive images on said film within the view of said device for a relatively short interval and for a relatively long interval in rotation, means to transmit said picture signals, a satellite theater provided with a stage screen, means at said satellite theater to receive said signals, a plurality of cathode ray tubes at said satellite theater, each of the said tubes provided with an image screen, means including said tubes to reproduce partial images of said film images on their associated screens, and optical means to project said partial images to juxtaposed image areas on said stage screen.

9. In a television system for transmitting picture images in different color on a film to a satellite theater, means including a cathode ray device tube having an image screen with a lens system and suitable light ray directing elements for concurrently applying images in different locations on said screen for each image on said film to produce different groups of picture signals, each of the said groups of signals representative of a different color component in said film images, said means also comprising an electrical timing mechanism for controlling an electrical circuit at irregular intervals to move successive portions of said film within the view of said device for different intervals in rotation, means to transmit said picture signals, means at said satellite theater to receive said signals, means including a cathode ray tube at said satellite theater to produce a series of images for each different group of received picture signals, a stage screen at said satellite theater, and optical means to superimpose said different series of images on said stage screen to form composite color reproductions.

10. In a television system for transmitting picture images on a film to a satellite theater, means including a cathode ray device to produce picture signals representative of the images on said film, said means also comprising an electrical timing mechanism for controlling an electrical circuit at irregular intervals to move successive images on said film within the view of said device for different intervals in rotation, means including a photo-electric tube to produce electrical signals from a sound track on said film, means to transmit said picture signals and said electrical signals, means at said satellite theater to receive said signals, a cathode ray tube at said satellite theater provided with an image screen, means including said tube to reproduce said film images on said image screen from said received picture signals, a stage screen at said satellite theater, optical means to project said reproduced images on said stage screen, and means to produce an audible message from said received electrical signals.

11. In a private television system, generator means to produce first line and frame saw tooth waves, means including a cathode ray device under control of said saw tooth waves to produce at least two series of picture signals, each of the said series of signals representative of a different color component in a scene within the view of said device, means to produce a group of electrical signals representative of sound related to said scene, oscillator means to produce a carrier wave, means including a number of amplifiers with each amplifier having at least one control electrode under control of said line saw tooth waves to transmit portions of both of said series of picture signals and portions of said group of electrical signals in successive rotation modulated on said carrier wave. A receiving station to receive both of said series of picture signals and said portions of electrical signals, generator means at said station to produce second line and frame saw tooth waves in synchronism with said first line and frame saw tooth waves, means including a cathode ray tube, having an image screen, under control of said second saw tooth waves to produce two series of images on the image screen from said received picture signals, means including an amplifier under control of said second line saw tooth waves for selecting said received electrical signals to produce an audible message, a distant screen, and means to superimpose said two series of images to said distant screen to form thereon composite color reproductions.

12. In a television system, generator means to produce line and frame saw tooth waves, means including a cathode ray device under control of said saw tooth waves to produce at least two series of picture signals, each of the said series of signals representative of a different color component in a scene within the view of said device, microphone means to produce a first group of electrical signals representative of sound related to said scene, means to produce a second group of electrical signals representative of recorded messages, oscillator means to produce a carrier wave, and means including a plurality of gate amplifiers with each amplifier having at least one control electrode under control of said line saw tooth waves to transmit portions of both of the said series of picture signals and portions of both of the said groups of electrical signals in successive rotation modulated on said carrier wave.

13. In a television system, means to receive at least two series of picture signals and two groups of electrical signals, each of the said series of picture signals representative of a different color component in the scene being televised, generator means to produce line and frame saw tooth waves, means including a cathode ray device, having an image screen, under control of said saw tooth waves to produce two series of images on the image screen from said received picture signals, and means including a pair of amplifiers with each amplifier having at least one control electrode under control of said line saw tooth waves for selecting said received portions of both of the said groups of electrical signals to produce two separate audible messages.

14. In a television system, a cathode ray device having a first radio wave sensitive screen and a second photo-sensitive screen with an electron ray directed toward the second screen, means including a metallic radio wave lens system to apply radio waves reflected from a scene to said first screen causing a glow therefrom to apply an image representative of said scene to said second screen, and means including saw tooth wave generators to cause the electron ray to scan the said second screen to produce image signals for picture reproductions of said scene.

15. In a television system, a transmitting station, a plurality of cathode ray scanning devices at said station, means associated with said station including a first pair of said cathode ray scanning devices having a pair of adjustable members with one member controlling the other said member to produce from different points of view a first series of images and a second series of like images representative of the same area in a scene being televised, a distant screen, optical means including a second pair of said devices to combine the images in said first and second series on said distant screen, and means associated with said station including a cathode ray camera tube disposed relative said screen to produce video signals representative of the said combined images.

16. In a television system, a transmitting station, a plurality of cathode ray tubes associated with said station, each of the said tubes having an image screen and an electron ray directed toward its associated screen, means associated with said tubes including saw tooth wave generators to cause the electron rays to concurrently scan said screens, means including a first pair of said tubes having a pair of adjustable members with one member controlling the other said member to produce from different points of view a first series of images and a second series of like images of the same area in a scene being televised, each of the said series of images representative of different color components in said scene, a distant screen, means including a pair of lenses associated with a second pair of said tubes to project on said distant screen the images in said first series over the images in said second series, means associated with said station including a cathode ray camera tube disposed relative said distant screen to produce video signals representative of the combination of both of said series of images projected on said distant screen, and means associated with said station to transmit said video signals.

17. In a television system, a transmitting station, a plurality of cathode ray tubes associated with said station, each of the said tubes having an image screen and an electron ray directed toward its associated screen, means associated with said tubes including two saw tooth wave generators to cause the electron rays to concurrently scan said screens, means including a first pair of said tubes having a pair of adjustable members with one member controlling the other said member to produce from different points of view a first series of images and a second series of like images of the same scene being televised, each of the said series of images representative of different color components in said scene, a distant screen, means including a pair of lenses associated with a pair of said tubes to project on said distant screen the images in said first series over the images in said second series, means associated with said station including a cathode ray camera tube disposed relative said distant screen to produce video signals representative of the combination of both of said series of images projected on said distant screen, means including a pair of microphones disposed at different points relative said scene to produce two series of electrical signals representative of two messages related to said scene, and means including a plurality of gate amplifiers under control of one of said saw tooth generators to transmit said video signals and said two series of electrical signals in successive rotation.

18. In a television system, a main station, means at said station to produce line synchronizing signals and frame synchronizing signals, means at said station to transmit said synchronizing signals, a distant station comprising a television transmitter and a television receiver, means associated with said receiver to receive said synchronizing signals, a pair of cathode ray camera tubes associated with said transmitter, each of the said tubes having an image screen and an electron ray directed toward its associated screen, means including saw tooth wave generators under control of said received synchronizing signals to produce line saw tooth waves and frame saw tooth waves, means under control of said saw tooth waves to cause the electron rays to scan their associated screens to produce two groups of picture signals representative of a common scene within the view of both of said tubes, means associated with said transmitter including a plurality of gate amplifiers having at least one control electrode per gate amplifier under control of said line saw tooth waves to transmit said groups of picture signals in rotation, receiver means at said main station under control of the said synchronizing signals produced at said main station to receive said groups of picture signals; and means at said main station including said signal transmitting means electrically coupled to said receiver means to retransmit said received group of picture signals with said synchronizing signals produced at said main station.

19. In a television system, a master station, means at said master station to produce a plurality of sets of synchronizing signals with different frequencies, signal transmitting means at said station to transmit said synchronizing signals, a slave television station comprising a television transmitter for transmitting picture signals representative of the images in different color on a motion picture film and a television receiver, means associated with said receiver to receive said synchronizing signals, a cathode ray camera tube associated with said transmitter having an image screen and an electron ray directed toward the screen, means associated with said tube including a lens system to project images to different portions of said screen according to the different primary colors in the film images being televised, means including film moving mechanism under control of certain of the received said synchronizing signals to move said film within the view of said lens system to project the different film images to said screen, means including saw tooth wave generators under control of at least two sets of said received synchronizing signals to cause the electron ray to scan multi-lines per frame on said screen to produce said picture signals, means associated with said transmitter to transmit said picture signals, receiver means associated with said master station to receive said picture signals, and means electrically coupled to said receiver means at said master station including said signal transmitting means to retransmit said received picture signals with the said synchronizing signals produced at the said master station.

20. In a television system, a main station, means at said station to produce line synchronizing signals and frame synchronizing signals with the line synchronizing signal frequency different than the frame synchronizing signal frequency, signal transmitting means at said station to transmit said synchronizing signals, a mobile station comprising a television transmitter and a television receiver, means associated with said receiver to receive said synchronizing signals, a cathode ray camera tube associated with said transmitter having an image screen and an electron ray directed toward the screen, means including saw tooth wave generators under control of said received synchronizing signals to cause the electron ray to scan multi-line per frame on said screen to produce picture signals representative of a scene within the view of said tube, means associated with said transmitter to transmit said picture signals, receiver means at said main station under control of the said synchronizing signals produced thereat to receive said picture signals, and means at said main station including said signal transmitting means electrically coupled to said receiver means to retransmit said received picture signals in successive rotation with said synchronizing signals.

21. In a television system, a transmitting station, a plurality of cathode ray scanning devices at said station, means associated with said station including a first pair of said cathode ray scanning devices having movable lenses with the movement of one lens controlling the movement of the other said lens to produce from different points of view a first series of images and a second series of images of the same area in a scene being televised, a distant screen, optical means associated with a second pair of said devices to superimpose on said screen each of the images in said first series over a different one of the images in said second series, means associated with said station including a cathode ray camera tube disposed relative said screen to produce video signals representative of said superimposed images, and means associated with said station to transmit said video signals.

22. In a television system, a cathode ray camera tube having an image screen and an electron ray directed toward the screen, means associated with said tube to produce a first series of saw tooth waves and a second series of saw tooth waves, a single optical path lens system for said tube, means comprising light beam splitting members and said lens system to apply a number of images of a scene within the view of said lens system to different screen sections in a vertical row on said screen, means associated with said tube under control of both of said series of saw tooth waves to cause the electron ray to scan in bi-dimensional directions said screen sections in successive rotation to produce different trains of picture signals, each of the said trains of picture signals representative of the images on a different screen section, and means including a plurality of gate amplifiers having at least one control electrode per amplifier under control of said second series of saw tooth waves to transmit said trains of picture signals in successive rotation.

23. In a television system, a main station, means at said station to produce line synchronizing signals and frame synchronizing signals, signal transmitting means at said station to transmit said synchronizing signals, a distant station comprising a television transmitter and a television receiver, means associated with said receiver to receive said synchronizing signals, a cathode ray camera tube associated with said transmitter having an image screen and an electron ray directed toward the screen, generator means associated with said transmitter and said receiver under control of said received synchronizing signals to produce line saw tooth waves and frame saw tooth waves, deflecting means under control of said saw tooth waves to cause the electron ray to scan said screen to produce picture signals representative of a scene within the view of said tube, means to produce electrical signals representative of sound related to said scene, means associated with said transmitter including a plurality of amplifiers having at least one control electrode per amplifier under control of said line saw tooth waves to transmit said picture signals and frementary portions of said electrical signals in successive rotation, receiver means at said main station to receive said picture signals and said portions of the electrical signals, and means at said main station including said signal transmitting means electrically connected to said receiver means to retransmit said received picture signals and said portions of the electrical signals with the said synchronizing signals produced at said main station.

24. In a television system, a transmitting station, a plurality of cathode ray scanning devices at said station, means associated with said station including a first pair of said cathode ray scanning devices having a pair of adjustable members with one member controlling the other said member to produce from diffrent points of view a first series of images and a second series of images of the same area in a scene being televised, a distant screen, optical means associated with a second pair of said devices to superimpose on said screen each of the images in said first series over a similar one of the images in said second series, a motion picture camera having a light sensitive film, and means including said camera focused on said screen to record said superimposed images on said film.

25. In a television system, a receiver to receive different groups of picture signals in different recurrent periods of time and synchronizing signals, a plurality of cathode ray tubes associated with said receiver, each of the said tubes having an image screen and an electron ray directed toward its associated screen, generator means associated with said tubes under control of said receiver synchronizing signals to produce a series of line saw tooth waves and a series of frame saw tooth waves, a plurality of gate amplifiers with each amplifier having at least one control electrode under control of said frame saw tooth waves to render the amplifiers conductive in successive rotation to supply each of the said tubes with a different group of said received groups of picture signals, and deflecting means associated with said tubes under control of said saw tooth waves to cause the electron rays to scan in successive rotation their respective screens in bi-dimensional directions to produce from said received different groups of picture signals a series of different images on each of the said screens representative of the scene being televised.

26. In a television system, a receiver to receive different trains of picture signals and synchronizing signals, each of the said trains of picture signals representative of a different color component of a scene being televised, a plurality of cathode ray tubes associated with said receiver, each of the said tubes having an image screen and an electron ray directed toward its associated screen, generator means under control of said received synchronizing signals to produce saw tooth waves, deflecting means associated with said tubes under control of said saw tooth waves to cause the electron rays to scan simultaneously their respective screens to produce from said received different trains of picture signals a series of images on each of the said screens representative of a different color component of said scene, a plurality of motion picture cameras, each of the said cameras, having a light sensitive film, disposed with a different one of the said image screens in its field of view, and means including film moving mechanism under control of said synchronizing signals to expose successive portions of each of the said films to light rays from its associated screen to record on each of the said films images representative of a different color component of said scene.

27. In a color television system, a receiver to receive different groups of picture signals, each of the said groups representative of a different color component of a scene being televised, and different groups of electrical signals representative of like messages, but from different locations at said scene, a plurality of cathode ray tubes associated with said receiver, each of the said tubes having an image screen and an electron ray directed toward its screen, generator means associated with said tubes to produce a series of line saw tooth waves and a series of frame saw tooth waves, a plurality of loud speakers associated with said receiver, a plurality of pairs of gate amplifiers under control of said line saw tooth waves to render said pairs of amplifiers conductive in successive rotation to supply a different group of picture signals to each of the said tubes and a different group of electrical signals to each of the said loud speakers for stereophonic message reproduction, deflecting means associated with said tubes under control of said saw tooth waves to cause the electron rays to scan simultaneously their respective screens in bi-dimensional directions to produce a series of images on each of the said screens representative of a different color component of said scene, a distant viewing screen, a lens system, and means associated with said tubes including said lens system to superimpose the images in the said different series on said viewing screen for a series of pictures of said scene in color.

28. In a color television system, a receiver to receive picture signals representative of different color components of the scene being televised, a plurality of sets of three cathode ray tubes, each of the said tubes for each said set provided with a phosphor to yield a different primary color, means including saw tooth wave generating circuits and other suitable circuits to produce from said received signals three different series of images on the said image screens for each said set of three tubes representative of a different portion of said scene, a distant viewing screen, and means associated with said tubes including a lens system for each set of three tubes to project said images for each set of three tubes to a different portion of said distant screen for complete pictures of said scene in color.

29. In a color television system, a television transmitter for transmitting picture signals representative of the images in different color on a motion picture film, a cathode ray camera tube associated with said transmitter having an image screen and an electron ray directed toward the screen, means associated with said transmitter to produce first saw tooth waves, a single optical path lens system for said tube, means including film moving mechanism to move said film within the view of said lens system, means comprising light ray splitting members and said lens system to project the colored images on said film to different selected portions on said screen according to the different primary colors in the images on said film, deflecting means under control of said saw tooth waves to cause the electron ray to scan said screen to produce a different interrupted train of picture signals for each different primary color in the film images being televised, means associated with said transmitter including a plurality of gate amplifiers with each amplifier having at least one control electrode under control of said saw tooth waves to transmit said different trains of picture signals in successive rotation, a television receiver to receive said different trains of picture signals, a cathode ray picture tube associated with said receiver having a viewing screen and an electron beam directed toward the viewing screen, generator means associated with said picture tube to produce second saw tooth waves in synchronism with said first saw tooth waves, and deflecting means under control of said second saw tooth waves to cause the electron beam to scan said viewing screen to produce different facsimile images thereon according to the said received different trains of picture signals.

30. In a television system as claimed in claim 25 comprising in addition, a distant viewing screen, a single optical path lens system, and means including a box-like container for said tubes comprising members to direct light rays from each of the said image screens through said lens system to superimpose the images in the said different series on said viewing screen.

31. In a television system, a main station, means at said station to produce line synchronizing signals and frame synchronizing signals with the line synchronizing signal frequency higher than the frame synchronizing signal frequency, signal transmitting means at said station to transmit said synchronizing signals, a satellite station comprising a television transmitter and a television receiver, means associated with said receiver to receive said synchronizing signals, a cathode ray camera tube associated with said transmitter having an image screen and an electron ray directed toward the screen, means associated with said tube including a lens system to produce images in different portions of said screen according to the different primary colors in a scene within the view of said lens system, means including saw tooth wave generators under control of said received synchronizing signals to cause the electron ray to scan multi-lines per frame on said screen to produce picture signals representative of said images, means associated with said transmitter to transmit said picture signals, receiver means at said main station under control of the said synchronizing signals produced thereat to receive said picture signals, and means at said main station including said signal transmitting means electrically connected with said receiver means to retransmit said received picture signals with said synchronizing signals.

32. In a television system, a main station, means at said station to produce line synchronizing signals and frame synchronizing signals with the line synchronizing signal frequency higher than the frame synchronizing signal frequency, means at said station to produce a first carrier wave, signal transmitting means at said station to transmit said synchronizing signals modulated on said first carrier wave, a satellite station comprising a television transmitter and a television receiver, means associated with said receiver to receive said synchronizing signals, a cathode ray camera tube associated with said transmitter having an image screen and an electron ray directed toward the screen, means including saw tooth wave generators under control of said received synchronizing signals to cause the electron ray to scan multi-lines per frame on said screen to produce picture signals representative of a scene within the view of said tube, means associated with said transmitter to produce a second carrier wave, means associated with said transmitter to transmit said picture signals modulated on said second carrier wave, receiver means at said main station to receive said picture signals, and means at said main station including said signal transmitting means electrically connected with said receiver means to retransmit said received picture signals modulated on said first carrier wave with said synchronizing signals.

33. In a television system, a main station, means at said station to produce synchronizing signals, signal transmitting means at said station to transmit said synchronizing signals, a satellite station comprising a television transmitter and a television receiver, means associated with said receiver to receive said synchronizing signals, a cathode ray camera tube associated with said transmitter having an image screen and an electron ray directed toward the screen, means associated with said tube including a lens system to produce images in different areas on said screen according to the different primary colors in a scene within the view of said lens system, generator means associated with said transmitter and said receiver under control of said received synchronizing signals to produce saw tooth waves, deflecting means under control of said saw tooth waves to cause the electron ray to scan said screen to produce picture signals representative of said images, means to produce a first train of electrical signals representative of sound related to said scene, means associated with said transmitter including a plurality of amplifiers having at least one electrode per amplifier under control of certain of said saw tooth waves to transmit said picture signals and fragmentary portions of said electrical signals during different recurring periods of time, receiver means at said main station to receive said picture signals, and means at said main station including said signal transmitting means electrically connected with said receiver means to retransmit said received picture signals and said portions of the electrical signals with the said synchronizing signals produced at said main station.

34. In a color television system, a television transmitter for transmitting the images in different colors on a motion picture film, a cathode ray camera tube associated with said transmitter having an image screen and an electron ray directed toward the screen, means to produce synchronizing signals, means associated with said tube under control of said synchronizing signals to produce saw tooth waves, a lens system for said tube, means including film moving mechanism having an electrical timing device under control of certain of said synchronizing signals for controlling an electrical circuit at irregular intervals to move said film within the view of said lens system with the alternate film images in the view for a longer period of time than the intermediate film images, means associated with said tube including said lens system to project the colored images on said film to different selected portions on said screen according to the different primary colors in the images on said film, and deflecting means under control of said saw tooth waves to cause the electron ray to scan said screen to produce a different interrupted train of picture signals for each different primary color in the film images being televised.

35. In a film, television system, a motion picture theater, a television transmitter for transmitting the images on said film, a cathode ray camera tube associated with said transmitter having a photo-sensitive screen and an electron ray directed toward the photo-sensitive screen, means associated with said tube to produce first saw tooth waves, a lens system for said tube, means including film moving mechanism having an electrical timing device under control of said saw tooth waves for controlling an electrical circuit at irregular intervals to move said film within the view of said lens system with the alternate film images in the view for a longer period of time than the intermediate film images, means including said lens system to project the images on said film to said photo-sensitive screen, deflecting means under control of said saw tooth waves to cause the electron ray to scan said photo-sensitive screen to produce picture signals representative of said film images, means associated with said transmitter to transmit said picture signals, a television receiver to receive said picture signals, a cathode ray picture tube associated with said receiver having a projecting screen and an electron beam directed toward the projecting screen, generator means associated with said picture tube to produce second saw tooth waves in synchronism with said first saw tooth waves, deflecting means under control of said second saw tooth waves to cause the electron beam to scan said projecting screen to produce images thereon from said received picture signals, a distant screen, and means including a second lens system to project said projecting screen images to said distant screen.

36. In a film having images in different color, television system, a motion picture theater, a television transmitter for transmitting the images on said film, a cathode ray camera tube associated with said transmitter having a photo-sensitive screen and an electron ray directed toward the photo-sensitive screen, means associated with said tube to produce first saw tooth waves, a lens system for said tube, means including film moving mechanism having an electrical timing device under control of said saw tooth waves for controlling an electrical circuit at irregular intervals to move said film within the view of said lens system with the alternate film images in the view for a longer period of time than the intermediate film images, means associated with said tube including said lens system to project the colored images on said film to different selected portions on said screen according to the different primary colors in the images on said film, deflecting means under control of said saw tooth waves to cause the electron ray to scan said photo-sensitive screen to produce a different interrupted train of picture signals for each different primary color in the film images being televised, means associated with said transmitter to transmit said different trains of picture signals, a television receiver to receive said different trains of picture signals, a cathode ray picture tube associated with said receiver having a projecting screen and an electron beam directed toward the projecting screen, generator means associated with said picture tube to produce second saw tooth waves in synchronism with said first saw tooth waves, deflecting means under control of said second saw tooth waves to cause the electron beam to scan said projecting screen to produce images thereon from said received picture signals, a distant screen, and means including a second lens system to project said projecting screen images to said distant screen.

37. In a color television system, a television transmitter for transmitting the images in different color on a motion picture film, a cathode ray camera tube associated with said transmitter, having an image screen and an electron ray directed toward the screen, means associated with said transmitter to produce saw tooth waves and synchronizing signals to control the time intervals of the saw tooth waves, a single optical path lens system for said tube, means including film moving mechanism to move said film within the view of said lens system, means including at least a pair of mirrors and said lens system to project the colored images on said film to different selected portions on said screen according to the different primary colors in the images on said film, deflecting means under control of said saw tooth waves to cause the electron ray to scan said screen to produce a different interrupted train of picture signals for each different primary color in the film images being televised, and means associated with said transmitter including a plurality of gate amplifiers with each amplifier having at least one control electrode under control of certain of said saw tooth waves to transmit said different trains of picture signals in successive rotation and said synchronizing signals.

38. In a color television system, a television transmitter for transmitting the images in color on a motion picture film and accompanying messages recorded in a sound track on said film, a cathode ray camera tube associated with said transmitter having an image screen and an electron ray directed toward the screen, means associated with said transmitter to produce first saw tooth waves, a single optical path lens system for said tube, means including film moving mechanism to move said film within the view of said lens system, means comprising light beam splitting members and said lens system to project the colored images on said film to different selected portions on said screen according to the different primary colors in the images on said film, deflecting means under control of said saw tooth waves to cause the electron ray to scan said screen to produce a different interrupted train of picture signals for each different primary color in the film images being televised, electronic means to produce electrical signals representative of the sound track on said film, and means associated with said transmitter including a plurality of gate amplifiers with each amplifier having at least one control electrode under control of certain of said saw tooth waves to transmit said different trains of picture signals and said electrical signals in successive rotation.

39. In a color television system, a transmitting station, a cathode ray camera tube associated with said station having an image screen, means associated with said tube to produce saw tooth waves and synchronizing signals to control the duration of the saw tooth waves, film mechanism associated with said tube having a movable film with images in different color thereon, said mechanism comprising electrical apparatus under control of certain of said synchronizing signals for controlling an electrical circuit at irregular intervals to move successive images on said film within the view of said screen during different intervals, and means including said cathode ray tube under control of said saw tooth waves to produce picture signals representative of the images on said film.

40. In a color television system, a receiver to receive synchronizing signals and different trains of picture signals in different recurrent periods of time, each of the said trains of signals representative of a different color in the scene being televised, a cathode ray tube associated with said receiver having an image screen and an electron ray directed toward the screen, means associated with said tube under control of said received synchronizing signals to produce a series of line saw tooth waves and a series of frame saw tooth waves, a plurality of gate amplifiers with each amplifier having at least one control electrode under control of said line saw tooth waves to render the amplifiers conductive in successive rotation to select and supply said different trains of signals in successive rotation to said tube, and means associated with said tube under control of said saw tooth waves to cause the electron ray to successively scan said screen to produce images thereon representative of the different colors in said scene.

41. In a television system, a cathode ray tube having an image screen and an electron ray directed toward the screen, a cover for said tube comprising a first lens system to apply images of a first distant scene to a first portion of said screen and a second lens system to applying images of a second scene, at a distance different than the distance of said first scene from said screen, to a second portion of said screen, and means to cause the electron ray to scan said screen to produce picture signals representative of both said first and said second scenes.

42. A television system as claimed in claim 29, and in addition there is provided for said camera tube a cover comprising said lens system and a second lens system to apply images of a distant scene, at a distance different than the distance of said film to said image screen, to a different portion of said image screen than said selected portions, whereby the said picture signals produced at said camera tube are also representative of said scene.

43. In a television system, a main television station, a first cathode ray camera tube at said station having a first image screen and an electron ray directed toward the screen, for said tube a cover comprising a first lens system to apply images of a first scene to a first portion of said screen, means associated with said tube to produce first saw tooth waves and synchronizing signals for controlling the interval of the first saw tooth waves, means under control of said saw tooth waves to cause the electron ray to scan said screen to produce first picture signals representative of said first scene during a first recurrent period of time, means associated with said first tube to produce a carrier wave, signal transmitter means at said first station to transmit said synchronizing signals and said first picture signals modulated on said carrier wave, a satellite television station, a receiver at said satellite station to receive said synchronizing signals, a second cathode ray tube at said satellite station having a second image screen and an electron beam directed toward the second screen, for said second tube a cover comprising a second lens system to apply images of a second scene to a second portion of said second screen, means associated with said second cathode ray tube under control of said received synchronizing signals to produce second saw tooth waves, means under control of said second saw tooth waves to cause the electron beam to scan said second screen to produce second picture signals representative of said second scene during a second recurrent period, means at said satellite station to transmit said second picture signals, receiver means at said main station to receive said second picture signals, and means at said main station including said signal transmitter means electrically connected with said receiver means to retransmit said second picture signals modulated on said carrier wave in successive rotation with said first picture signals.

JOHN H. HOMRIGHOUS.

REFERENCES CITED

The following references are of record in the file of this patent:

UNITED STATES PATENTS

| Number | Name | Date |
|---|---|---|
| 2,073,370 | Goldsmith | Mar. 9, 1937 |
| 2,249,606 | Friebus | July 15, 1941 |
| 2,253,292 | Goldsmith | Aug. 19, 1941 |
| 2,275,898 | Goldsmith | Mar. 10, 1942 |
| 2,278,788 | Knick | Apr. 7, 1942 |
| 2,294,820 | Wilson | Sept. 1, 1942 |
| 2,296,908 | Crosby | Sept. 29, 1942 |
| 2,329,339 | Debaun | Sept. 14, 1943 |
| 2,333,969 | Alexanderson | Nov. 11, 1943 |
| 2,335,180 | Goldsmith | Nov. 23, 1943 |
| 2,337,980 | Dumont | Dec. 28, 1943 |
| 2,375,966 | Valensi | May 15, 1945 |
| 2,389,646 | Sleeper | Nov. 27, 1945 |
| 2,414,453 | DeFrance | Jan. 21, 1947 |
| 2,417,446 | Reynolds | Mar. 18, 1947 |
| 2,420,029 | Brady | May 6, 1947 |
| 2,423,768 | Goldsmith | July 8, 1947 |
| 2,492,926 | Valensi | Dec. 27, 1949 |